(12) United States Patent
Lloyd

(10) Patent No.: US 9,672,724 B2
(45) Date of Patent: Jun. 6, 2017

(54) AUTOMATIC CONFIGURATION OF ALARM AGGREGATIONS

(71) Applicant: SCHNEIDER ELECTRIC USA, INC., Palatine, IL (US)

(72) Inventor: Chad A. Lloyd, Old Hickory, TN (US)

(73) Assignee: SCHNEIDER ELECTRIC USA, INC., Andover, MA (US)

( * ) Notice: Subject to any disclaimer, the term of this patent is extended or adjusted under 35 U.S.C. 154(b) by 0 days.

(21) Appl. No.: 14/779,823

(22) PCT Filed: Mar. 31, 2013

(86) PCT No.: PCT/US2013/034745
§ 371 (c)(1),
(2) Date: Sep. 24, 2015

(87) PCT Pub. No.: WO2014/163605
PCT Pub. Date: Oct. 9, 2014

(65) Prior Publication Data
US 2016/0063845 A1    Mar. 3, 2016

(51) Int. Cl.
*G08B 21/00* (2006.01)
*G08B 21/18* (2006.01)
*G05B 23/02* (2006.01)

(52) U.S. Cl.
CPC ......... *G08B 21/187* (2013.01); *G05B 23/027* (2013.01)

(58) Field of Classification Search
CPC ............ G05B 15/02; G05B 2219/2642; G05B 23/027; G08B 21/187
USPC ................................... 340/3.1, 679
See application file for complete search history.

(56) References Cited

U.S. PATENT DOCUMENTS

| 7,716,012 | B2 | 5/2010 | Bickel |
| 2006/0238339 | A1 | 10/2006 | Primm et al. |
| 2007/0282988 | A1 | 12/2007 | Bornhoevd et al. |
| 2009/0066528 | A1 | 3/2009 | Bickel et al. |
| 2009/0204368 | A1 | 8/2009 | Bickel |
| 2009/0271792 | A1* | 10/2009 | Mills ........................ G06F 9/542 718/103 |
| 2011/0187488 | A1* | 8/2011 | Fiske ......................... G08B 5/36 340/3.1 |

(Continued)

OTHER PUBLICATIONS

International Search Report and the Written Opinion of the International Searching Authority from corresponding PCT/US2013/034745 mailed Jun. 10, 2013.

(Continued)

*Primary Examiner* — Ojiako Nwugo
(74) *Attorney, Agent, or Firm* — Lando & Anastasi, LLP

(57) ABSTRACT

According to another embodiment, a system for generating alarm aggregation rules is provided. The system includes a memory and at least one processor coupled to the memory. The at least one processor is configured to receive information descriptive of a set of devices, each device within the set having one or more devices within the set that are associated with the device and each device of the set being capable of entering at least one anomalous state; identify at least one type of alarm aggregation rule that applies to at least one device within the set based on one or more anomalous states that the at least one device is capable of entering; and store an association between an alarm aggregation rule of the at least one type and the set of devices.

17 Claims, 15 Drawing Sheets

(56) References Cited

U.S. PATENT DOCUMENTS

2012/0185108 A1 7/2012 Howe et al.
2014/0280557 A1* 9/2014 McKinley .......... H04L 41/0273
          709/204

OTHER PUBLICATIONS

Extended European Search Report from corresponding European Application No. 13880897.7 dated Sep. 9, 2016.

* cited by examiner

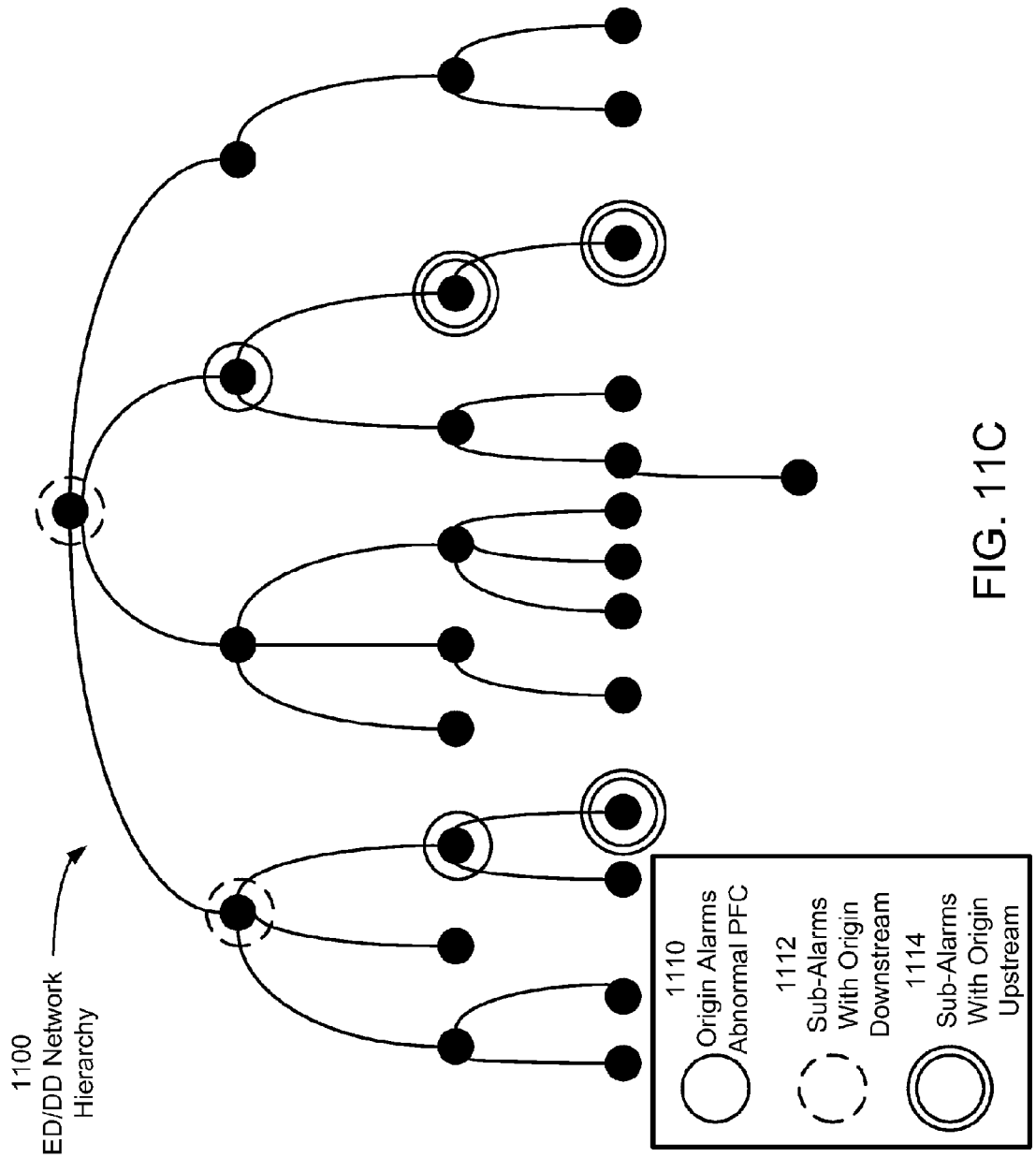

```xml
<-1300 Example ED Hierarchy-
<?xml version="1.0"?>
<OneLineDiagram>
  <Node Name="480V Bus A Main: 473" Type="Physical Device" Value="1,323.15" Correlation="" Level="0.00">
    <Children>
      <Node Name="MCC-C11-A: 473" Type="Physical Device" Value="476.49" Correlation="35.92" Level="1.00" />
      <Node Name="C-11 FORMING FAN 2: 472" Type="Physical Device" Value="126.98" Correlation="67.40" Level="1.00">
        <Children>
          <Node Name="C-11 FORMING FAN 3: 472" Type="Physical Device" Value="62.66" Correlation="82.59" Level="2.00">
            <Children>
              <Node Name="MCC-C11-D: 473" Type="Physical Device" Value="48.24" Correlation="60.66" Level="3.00" />
              <Node Name="" Type="Virtual Device" Value="14.42" Level="2.00" Correlation="100.00" />
            </Children>
          </Node>
          <Node Name="" Type="Virtual Device" Value="64.32" Level="1.00" Correlation="100.00" />
        </Children>
      </Node>
      <Node Name="" Type="Virtual Device" Value="526.45" Level="0.00" Correlation="100.00" />
    </Children>
  </Node>
  <Node Name="15KV MAIN: 126240" Type="Physical Device" Value="9,085.78" Correlation="" Level="0.00">
    <Children>
      <Node Name="480V Bus D Main: 477" Type="Physical Device" Value="952.10" Correlation="9.25" Level="1.00">
        <Children>
          <Node Name="MCC-C-P: 477" Type="Physical Device" Value="168.94" Correlation="71.25" Level="2.00">
            <Children>
              <Node Name="C-11 NWEP FAN: 475" Type="Physical Device" Value="74.50" Correlation="62.16" Level="3.00" />
              <Node Name="" Type="Virtual Device" Value="94.44" Level="2.00" Correlation="100.00" />
            </Children>
          </Node>
          <Node Name="DP-A: 477" Type="Physical Device" Value="303.31" Correlation="58.11" Level="2.00" />
          <Node Name="" Type="Virtual Device" Value="365.13" Level="1.00" Correlation="100.00" />
        </Children>
      </Node>
      <Node Name="Oxygen Plant: 12114" Type="Physical Device" Value="1,412.92" Correlation="86.21" Level="1.00">
        <Children>
          <Node Name="High Pressure Air Comp 2: 4150" Type="Physical Device" Value="730.76" Correlation="1.27" Level="2.00">
            <Children>
              <Node Name="" Type="Transformer" From="2400/4160" To="277/480" Level="1.00">
                <Children>
                  <Node Name="MCC-C1-F2: 473" Type="Physical Device" Value="128.18" Correlation="15.89" />
                  <Node Name="MCC-C11-B: 473" Type="Physical Device" Value="32.64" Correlation="46.99" />
                </Children>
              </Node>
              <Node Name="Low Pressure Air Comp 2: 4183" Type="Physical Device" Value="559.39" Correlation="16.05" Level="3.00">
                <Children>
                  <Node Name="Low Pressure Air Comp 3: 4151" Type="Physical Device" Value="550.04" Correlation="99.41" Level="4.00">
                    <Children>
                      <Node Name="" Type="Transformer" From="2400/4160" To="277/480" Level="1.00">
                        <Children>
                          <Node Name="MCC-SOUTH-WEP: 477" Type="Physical Device" Value="224.17" Correlation="44.92">
                            <Children>
                              <Node Name="C-11 SWEP FAN: 475" Type="Physical Device" Value="151.82" Correlation="94.34" Level="6.00" />
                              <Node Name="" Type="Virtual Device" Value="72.35" Level="5.00" Correlation="100.00" />
                            </Children>
                          </Node>
                          <Node Name="MCC-C11-E: 473" Type="Physical Device" Value="83.91" Correlation="74.25" />
                        </Children>
                      </Node>
                      <Node Name="" Type="Virtual Device" Value="241.96" Level="4.00" Correlation="100.00" />
                    </Children>
                  </Node>
                  <Node Name="" Type="Virtual Device" Value="9.35" Level="3.00" Correlation="100.00" />
                </Children>
              </Node>
              <Node Name="" Type="Virtual Device" Value="10.56" Level="2.00" Correlation="100.00" />
            </Children>
          </Node>
          <Node Name="" Type="Virtual Device" Value="682.16" Level="1.00" Correlation="100.00" />
        </Children>
      </Node>
    </Children>
  </Node>
</OneLineDiagram>
```

FIG. 13

AUTOMATIC CONFIGURATION OF ALARM AGGREGATIONS

RELATED APPLICATION

This application is a U.S. National Stage Application under 35 U.S.C. §371 of International Application No. PCT/US2013/034745, filed Mar. 31, 2013, which is hereby incorporated herein by reference in the entirety.

NOTICE OF MATERIAL SUBJECT TO COPYRIGHT PROTECTION

Portions of the material in this patent document are subject to copyright protection under the copyright laws of the United States and of other countries. The owner of the copyright rights has no objection to the facsimile reproduction by anyone of the patent document or the patent disclosure, as it appears in the United States Patent and Trademark Office publicly available file or records, but otherwise reserves all copyright rights whatsoever. The copyright owner does not hereby waive any of its rights to have this patent document maintained in secrecy, including without limitation its rights pursuant to 37 C.F.R. §1.14.

BACKGROUND

Technical Field

At least one aspect in accord with the embodiments disclosed herein relates generally to apparatus and processes for monitoring physical infrastructure, and more specifically, to apparatus and processes directed to aggregation of alarms.

Discussion

Supervisory control and data acquisition (SCADA) systems are industrial control systems that provide for efficient monitoring of large scale industrial processes, infrastructure processes, or facility processes. Similarly, data center monitoring systems provide for efficient monitoring of large scale computing environments. Building management systems control and conserve resources consumed by the operation of subsystems within buildings and other structures. Conventional monitoring systems such as these include sensors that monitor the operating environment of the physical infrastructure and, in some cases, the operational status of individual pieces of equipment. Under some configurations, these sensors report operational information to a centralized system that analyzes the operational information and generates any warranted alarms. Alarms are customarily reported to personnel charged with maximizing the uptime of infrastructure equipment.

SUMMARY

Aspects in accord with embodiments disclosed herein manifest an appreciation that conventional industrial monitoring systems and data center monitoring systems can be structured to monitor many hierarchically coupled subsystems and components. These vast hierarchies may report events that should be reported in a coordinated fashion as disparate events. When the number of coupled subsystems and components is large, an anomalous event in one component of the system can potentially cascade through multiple coupled subsystems and components resulting in an alarm avalanche of discretely reported events. Thus, according to various examples, systems and methods provide for the generation and configuration of aggregated alarms. These aggregated alarms may be configured via one or more rules. Further, in these examples, alarm aggregations direct the gathering and reporting of individual alarms as an entire group identifying the relationships between members of that group. Thus examples provide for relevant notifications that allow external entities, such as facility managers or data center technicians, to efficiently address potential problems within the operating environment of a physical infrastructure.

According to at least one embodiment, a method for automatically generating alarm aggregation rules using a computer system is provided. The method includes acts of receiving, by the computer system, information descriptive of a set of devices, each device within the set having one or more devices within the set that are associated with the device and each device of the set being capable of entering at least one anomalous state; identifying at least one type of alarm aggregation rule that applies to at least one device within the set based on one or more anomalous states that the at least one device is capable of entering; and storing an association between an alarm aggregation rule of the at least one type and the set of devices.

In the method, the act of receiving the information may include an act of receiving information descriptive of a hierarchy of devices. The act of receiving the information descriptive of the hierarchy of devices may include an act of receiving at least one of information descriptive of an electrical distribution hierarchy and information descriptive of a data distribution hierarchy. The act of identifying the at least one type of alarm aggregation rule may include an act of identifying one or more types of alarm aggregation rules from a table of alarm aggregation rule types. The act of identifying the one or more types of alarm aggregation rules may include an act of identifying the one or more types of alarm aggregation rules from a table that includes types of alarm aggregation rules that are applicable to an electrical distribution hierarchy.

The method may further include acts of receiving information descriptive of at least one alarm; determining that the at least one alarm is subject to the alarm aggregation rule; and identifying an origin device based on the information descriptive of the at least one alarm, the alarm aggregation rule, and the information descriptive of the set of devices. The act of identifying the origin device may include an act of identifying at least one of a feeder device, a load device, and an intermediate device. The information descriptive of the at least one alarm is descriptive of a plurality of alarms generated by a subset of devices from the set of devices and the method may further include an act of identifying the subset of devices based on the origin device and the alarm aggregation rule. The method may further include an act of displaying a representation of an instance of an aggregated alarm, the representation including a representation of the origin device and the subset of devices.

According to another embodiment, a system for generating alarm aggregation rules is provided. The system includes a memory and at least one processor coupled to the memory. The at least one processor is configured to receive information descriptive of a set of devices, each device within the set having one or more devices within the set that are associated with the device and each device of the set being capable of entering at least one anomalous state; identify at least one type of alarm aggregation rule that applies to at least one device within the set based on one or more anomalous states that the at least one device is capable of entering; and store an association between an alarm aggregation rule of the at least one type and the set of devices.

In the system, the at least one processor may be configured to receive the information by being configured to receive information descriptive of a hierarchy of devices. The at least one processor may be configured to receive the information descriptive of the hierarchy of devices by being configured to receive at least one of information descriptive of an electrical distribution hierarchy and information descriptive of a data distribution hierarchy. The at least one processor may be configured to identify the at least one type of alarm aggregation rule by being configured to identify one or more types of alarm aggregation rules from a table of alarm aggregation rule types. In the system, the table may include types of alarm aggregation rules that are applicable to an electrical distribution hierarchy.

In the system, the at least one processor may be further configured to receive information descriptive of at least one alarm; determine that the at least one alarm is subject to the alarm aggregation rule; and identify an origin device based on the information descriptive of the at least one alarm, the alarm aggregation rule, and the information descriptive of the set of devices. The at least one processor may be configured to identify the origin device by being configured to identify at least one of a feeder device, a load device, and an intermediate device.

In the system, the information descriptive of the at least one alarm may be descriptive of a plurality of alarms generated by a subset of devices from the set of devices and the at least one processor may be further configured to identify the subset of devices based on the origin device and the alarm aggregation rule. The at least one processor may be further configured to display a representation of an instance of an aggregated alarm, the representation including a representation of the origin device and the subset of devices.

According to another embodiment, a non-transitory computer readable medium is provided. The computer readable medium stores instructions for executing an alarm aggregation rule definition process. The instructions are executable by at least one processor of a computer system. The instructions instruct the computer system to receive information descriptive of a set of devices, each device within the set having one or more devices within the set that are associated with the device and each device of the set being capable of entering at least one anomalous state; identify at least one type of alarm aggregation rule that applies to at least one device within the set based on one or more anomalous states that the at least one device is capable of entering; and store an association between an alarm aggregation rule of the at least one type and the set of devices. The instructions that instruct the computer system to receive the information may instruct the computer system to receive information descriptive of a hierarchy of devices.

Still other aspects, embodiments and advantages of these example aspects and embodiments, are discussed in detail below. It is to be understood that both the foregoing information and the following detailed description are merely illustrative examples of various aspects and embodiments, and are intended to provide an overview or framework for understanding the nature and character of the claimed aspects and embodiments. Any embodiment disclosed herein may be combined with any other embodiment. References to "an embodiment," "an example," "some embodiments," "some examples," "an alternate embodiment," "various embodiments," "one embodiment," "at least one embodiment," "this and other embodiments" or the like are not necessarily mutually exclusive and are intended to indicate that a particular feature, structure, or characteristic described in connection with the embodiment may be included in at least one embodiment. The appearances of such terms herein are not necessarily all referring to the same embodiment.

BRIEF DESCRIPTION OF DRAWINGS

Various aspects of at least one example are discussed below with reference to the accompanying figures, which are not intended to be drawn to scale. Where technical features in the figures, detailed description or any claim are followed by references signs, the reference signs have been included for the sole purpose of increasing the intelligibility of the figures, detailed description, and claims. Accordingly, neither the reference signs nor their absence are intended to have any limiting effect on the scope of any claim elements. In the figures, each identical or nearly identical component that is illustrated in various figures is represented by a like numeral. For purposes of clarity, not every component may be labeled in every figure. The figures are provided for the purposes of illustration and explanation and are not intended as a definition of the limits of the embodiments disclosed herein. In the figures:

FIG. 11C is a diagram of another example alarm aggregation rule;

FIG. 13 is a textual rendering of an electrical distribution hierarchy.

DETAILED DESCRIPTION

Figure 1:
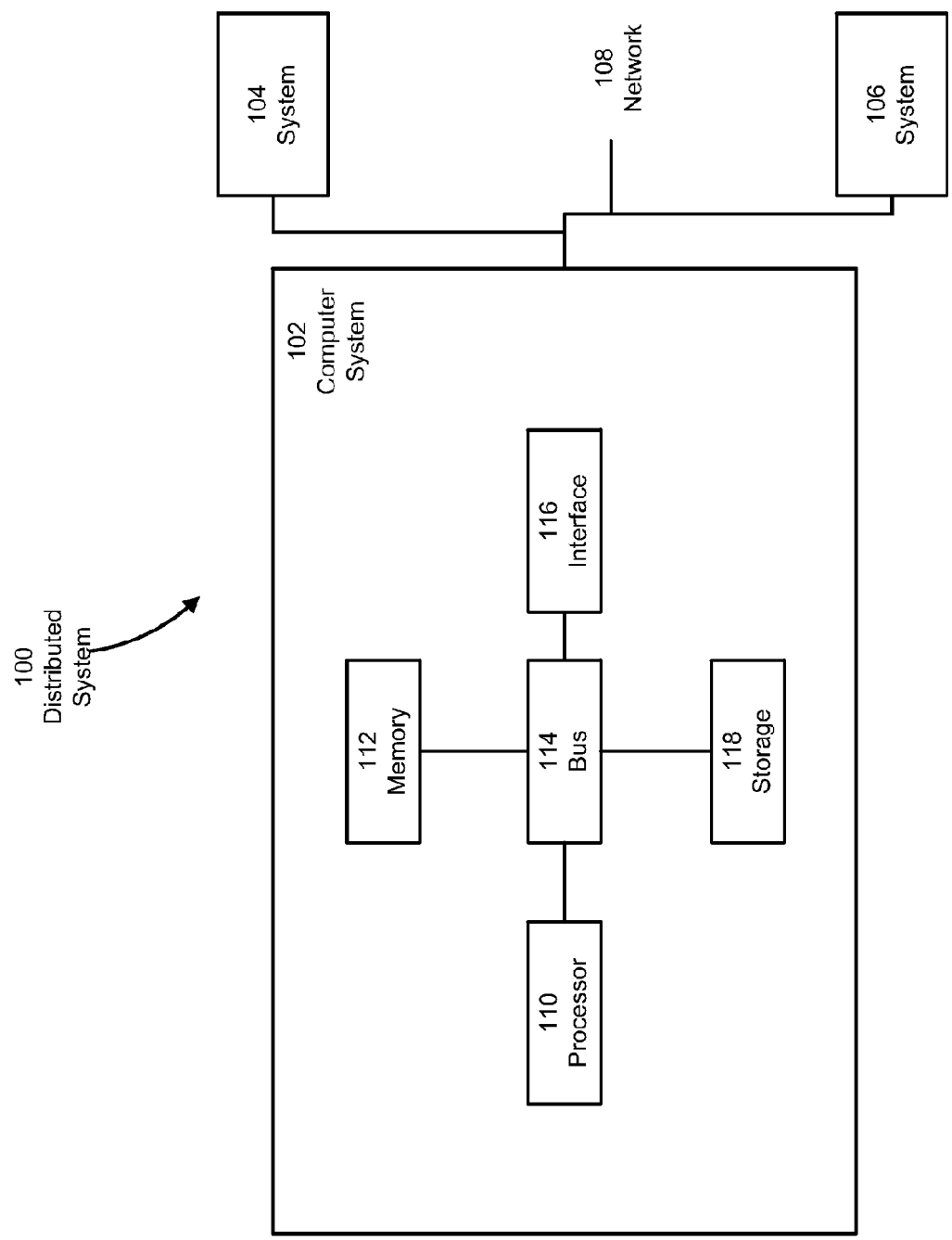
FIG. 1 is a block diagram of an example computer system in which various aspects in accord with the embodiments disclosed herein may be implemented.

Aspects and examples relate to apparatus and processes that automatically define, configure and maintain a set of alarm aggregation rules and notification policies that produce and distribute aggregated alarms. In at least one example, a system and method are provided for automatically configuring one or more aggregated alarms based on relationships between devices included in a set (e.g., a hierarchy) and the types of aggregated alarms available for configuration. According to some examples, the aggregated alarm has discrete characteristics separate from the individual alarms that triggered the aggregated alarm. In other examples, the aggregated alarm categorizes individual alarm instances as part of the overall alarm, thus allowing external entities, such as users or other systems, to review both the aggregated alarm and the individual alarm instances.

Examples of the methods and apparatuses discussed herein are not limited in application to the details of construction and the arrangement of components set forth in the following description or illustrated in the accompanying drawings. The methods and apparatuses are capable of implementation in other examples and of being practiced or of being carried out in various ways. Examples of specific implementations are provided herein for illustrative purposes only and are not intended to be limiting. In particular, acts, elements and features discussed in connection with any one or more examples are not intended to be excluded from a similar role in any other examples.

Also, the phraseology and terminology used herein is for the purpose of description and should not be regarded as limiting. Any references to examples or elements or acts of the apparatus and methods herein referred to in the singular may also embrace examples including a plurality of these elements, and any references in plural to any example or element or act herein may also embrace examples including only a single element. References in the singular or plural form are not intended to limit the presently disclosed systems or methods, their components, acts, or elements. The use herein of "including," "comprising," "having," "containing," "involving," and variations thereof is meant to encompass the items listed thereafter and equivalents thereof as well as additional items. References to "or" may be construed as inclusive so that any terms described using "or" may indicate any of a single, more than one, and all of the described terms. Any references to front and back, left and right, top and bottom, upper and lower, and vertical and horizontal are intended for convenience of description, not to limit the present apparatus and methods or their components to any one positional or spatial orientation. In addition, in the event of inconsistent usages of terms between this document and documents incorporated herein by reference, the term usage in the incorporated references is supplementary to that of this document; for irreconcilable inconsistencies, the term usage in this document controls.

Computer System

Various aspects and functions described herein may be implemented as hardware or software on one or more computer systems. There are many examples of computer systems currently in use. These examples include, among others, network devices, personal computers, workstations, mainframes, networked clients, servers, media servers, application servers, database servers and web servers. Other examples of computer systems may include mobile computing devices, such as cellular phones and personal digital assistants, and network equipment, such as load balancers, routers and switches. Further, aspects may be located on a single computer system or may be distributed among a plurality of computer systems connected to one or more communications networks.

For example, various aspects and functions may be distributed among one or more computer systems configured to provide a service to one or more client computers, or to perform an overall task as part of a distributed system. Additionally, aspects may be performed on a client-server or multi-tier system that includes components distributed among one or more server systems that perform various functions. Consequently, examples are not limited to executing on any particular system or group of systems. Further, aspects may be implemented in software, hardware or firmware, or any combination thereof. Thus, aspects may be implemented within methods, acts, systems, system elements and components using a variety of hardware and software configurations, and examples are not limited to any particular distributed architecture, network, or communication protocol.

Referring to FIG. 1, there is illustrated a block diagram of a distributed computer system 100, in which various aspects and functions may be practiced. The distributed computer system 100 may include one more computer systems that exchange, i.e. send or receive, information. For example, as illustrated, the distributed computer system 100 includes computer systems 102, 104 and 106. As shown, the computer systems 102, 104 and 106 are interconnected by, and may exchange data through, communication a network 108. The network 108 may include any communication network through which computer systems may exchange data. To exchange data using the network 108, the computer systems 102, 104 and 106 and the network 108 may use various methods, protocols and standards, including, among others, Token Ring, Ethernet, Wireless Ethernet, Bluetooth, TCP/IP, UDP, DTN, HTTP, FTP, SNMP, SMS, MMS, SS7, JSON, SOAP, CORBA, REST and Web Services. To ensure data transfer is secure, the computer systems 102, 104 and 106 may transmit data via the network 108 using a variety of security measures including, for example, TLS, SSL or VPN. While the distributed computer system 100 illustrates three networked computer systems, the distributed computer system 100 is not so limited and may include any number of computer systems and computing devices, networked using any medium and communication protocol.

Various aspects and functions may be implemented as specialized hardware or software executing in one or more computer systems including the computer system 102 shown in FIG. 1. As depicted, the computer system 102 includes a processor 110, a memory 112, a bus 114, an interface 116 and a storage element 118. The processor 110 may perform a series of instructions that result in manipulated data. The processor 110 may be a commercially available processor such as an Intel Xeon, Itanium, Core, Celeron, Pentium, AMD Opteron, Sun UltraSPARC, IBM Power5+, or IBM mainframe chip, but may be any type of processor, multiprocessor or controller. The processor 110 is connected to other system elements, including one or more memory devices 112, by the bus 114.

The memory 112 may be used for storing programs and data during operation of the computer system 102. Thus, the memory 112 may be a relatively high performance, volatile, random access memory such as a dynamic random access memory (DRAM) or static memory (SRAM). However, the memory 112 may include any device for storing data, such as a disk drive or other non-volatile storage device. Various examples may organize the memory 112 into particularized and, in some cases, unique structures to perform the functions disclosed herein.

Components of the computer system 102 may be coupled by an interconnection element such as the bus 114. The bus 114 may include one or more physical busses, for example, busses between components that are integrated within a same machine, but may include any communication coupling between system elements including specialized or standard computing bus technologies such as IDE, SCSI, PCI and InfiniBand. Thus, the bus 114 enables communications, for example, data and instructions, to be exchanged between system components of the computer system 102.

The computer system 102 also includes one or more interface devices 116 such as input devices, output devices and combination input/output devices. Interface devices may receive input or provide output. More particularly, output devices may render information for external presentation. Input devices may accept information from external sources. Examples of interface devices include keyboards, mouse devices, trackballs, microphones, touch screens, printing devices, display screens, speakers, network interface cards, etc. Interface devices allow the computer system 102 to exchange information and communicate with external entities, such as users and other systems.

The storage system 118 may include a computer readable and writeable nonvolatile data storage medium in which instructions are stored that define a program that may be executed by the processor 110. The storage system 118 also may include information that is recorded, on or in, the medium, and this information may be processed by the processor 110 during execution of the program. More specifically, the information may be stored in one or more data structures specifically configured to conserve storage space or increase data exchange performance. The instructions may be persistently stored as encoded signals, and the instructions may cause the processor 110 to perform any of the functions described herein. The medium may, for example, be optical disk, magnetic disk or flash memory, among others. In operation, the processor 110 or some other controller may cause data to be read from the nonvolatile recording medium into another memory, such as the memory 112, that allows for faster access to the information by the processor 110 than does the storage medium included in the storage system 118. The memory may be located in the storage system 118 or in the memory 112, however, the processor 110 may manipulate the data within the memory 112, and then copy the data to the medium associated with the storage system 118 after processing is completed. A variety of components may manage data movement between the medium and integrated circuit memory element and examples is not limited thereto. Further, examples are not limited to a particular memory system or storage system.

Although the computer system 102 is shown by way of example as one type of computer system upon which various aspects and functions may be practiced, aspects are not limited to being implemented on the computer system 102 as shown in FIG. 1. Various aspects and functions may be practiced on one or more computers having a different architectures or components than that shown in FIG. 1. For instance, the computer system 102 may include specially programmed, special-purpose hardware, such as for example, an application-specific integrated circuit (ASIC) tailored to perform a particular operation disclosed herein. While another example may perform the same function using a grid of several general-purpose computing devices running MAC OS System X with Motorola PowerPC processors and several specialized computing devices running proprietary hardware and operating systems.

The computer system 102 may be a computer system including an operating system that manages at least a portion of the hardware elements included in the computer system 102. Usually, a processor or controller, such as the processor 110, executes an operating system which may be, for example, a Windows-based operating system, such as, Windows NT, Windows 2000 (Windows ME), Windows XP or Windows Vista operating systems, available from the Microsoft Corporation, a MAC OS System X operating system available from Apple Computer, one of many Linux-based operating system distributions, for example, the Enterprise Linux operating system available from Red Hat Inc., a Solaris operating system available from Sun Microsystems, or a UNIX operating systems available from various sources. Many other operating systems may be used, and examples are not limited to any particular implementation.

The processor 110 and operating system together define a computer platform for which application programs in high-level programming languages may be written. These component applications may be executable, intermediate, byte-code or interpreted code which communicates over a communication network, for example, the Internet, using a communication protocol, for example, TCP/IP. Similarly, aspects may be implemented using an object-oriented programming language, such as .Net, SmallTalk, Java, C++, Ada, or C# (C-Sharp). Other object-oriented programming languages may also be used. Alternatively, functional, scripting, or logical programming languages may be used.

Additionally, various aspects and functions may be implemented in a non-programmed environment, for example, documents created in HTML, XML or other format that, when viewed in a window of a browser program, render aspects of a graphical-user interface or perform other functions. Further, various examples may be implemented as programmed or non-programmed elements, or any combination thereof. For example, a web page may be implemented using HTML while a data object called from within the web page may be written in C++. Thus, the examples are not limited to a specific programming language and any suitable programming language could be used.

The examples disclosed herein may perform a wide variety of functions and may be implemented using various tools. For instance, aspects of an exemplary system may be implemented using an existing commercial product, such as, for example, Database Management Systems such as SQL Server available from Microsoft of Seattle Wash., Oracle Database from Oracle of Redwood Shores, Calif., and MySQL from Sun Microsystems of Santa Clara, Calif. or integration software such as Web Sphere middleware from IBM of Armonk, N.Y. A computer system running, for example, SQL Server may be able to support both aspects in accord with specific examples disclosed herein and databases for sundry other applications not discussed in the present disclosure. Thus, functional components disclosed herein may include a wide variety of elements, such as executable code, data structures or objects, configured to perform their described functions.

System Context Diagrams

Figure 2:
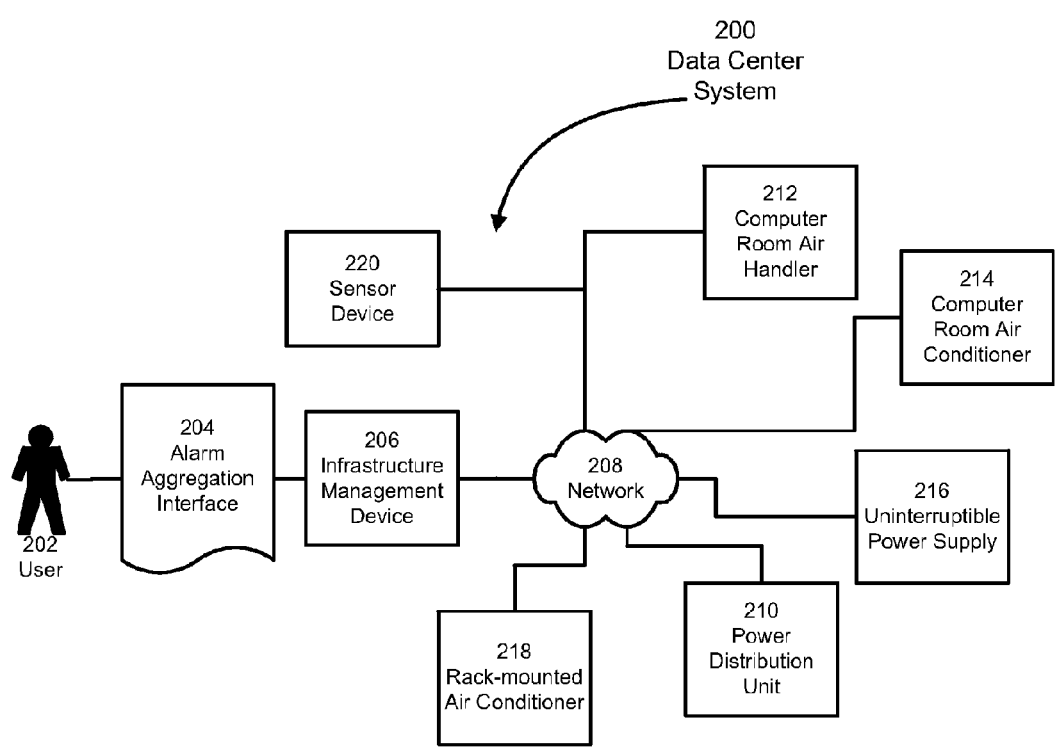
FIG. 2 is a block diagram of a data center including an infrastructure management device in accord with some aspects disclosed herein.
Figure 3:
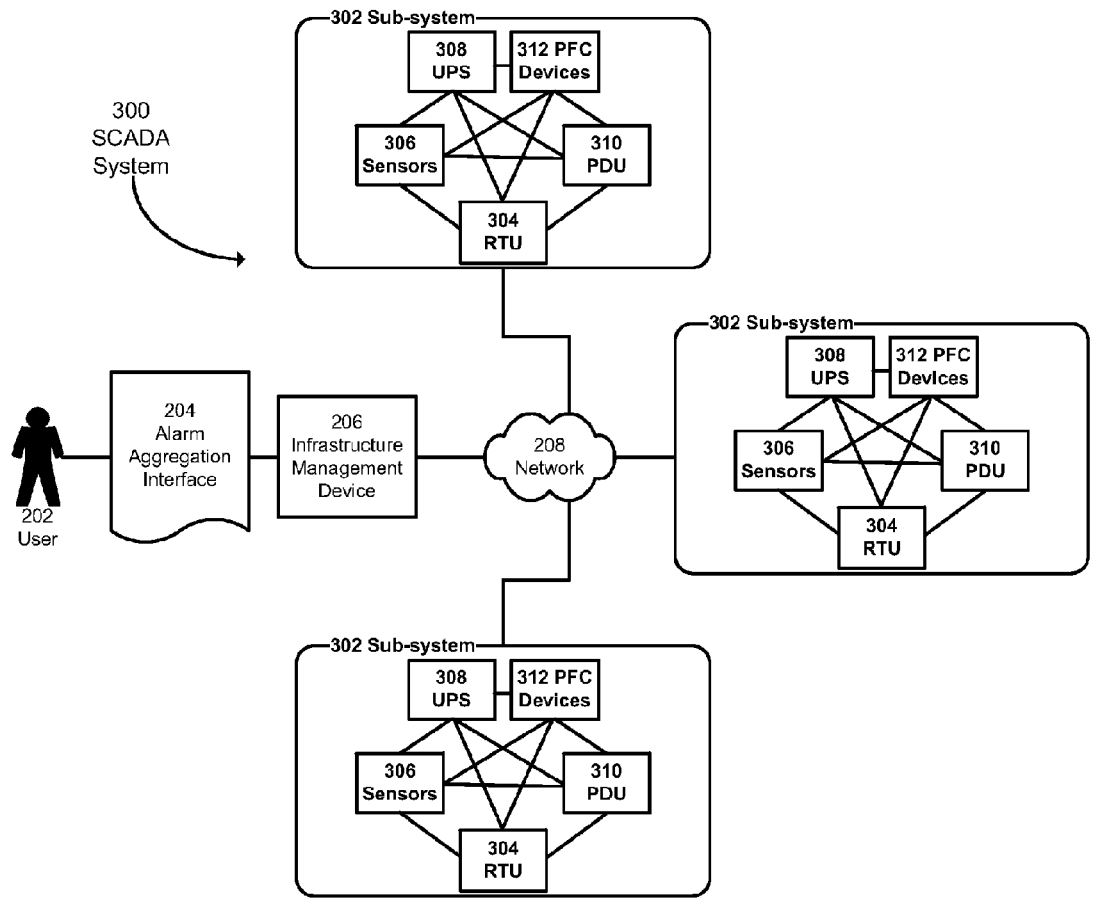
FIG. 3 is a block diagram of a SCADA system controlling multiple subsystems including an infrastructure management device in accord with aspects disclosed herein.

FIG. 2 and FIG. 3 present context diagrams including physical and logical elements of distributed systems 200 and 300 respectively. As shown, distributed systems 200 and 300 are specially configured to perform the various functions disclosed herein. The system structure and content disclosed with regard to FIG. 2 and FIG. 3 are for exemplary purposes only and are not intended to limit examples to the specific structures shown in FIG. 2 and FIG. 3. As will be apparent to one of ordinary skill in the art, many variant exemplary structures can be architected. The particular arrangements presented in FIG. 2 and FIG. 3 were chosen to promote clarity.

Information may flow between the elements, components and subsystems described herein using any technique. Such techniques include, for example, passing the information over the network via TCP/IP, passing the information between modules in memory and passing the information by writing to a file, database, or some other non-volatile storage device. In addition, pointers or other references to information may be transmitted and received in place of, or in addition to, copies of the information. Conversely, the information may be exchanged in place of, or in addition to, pointers or other references to the information. Other techniques and protocols for communicating information may be used without departing from the scope of the examples discussed herein.

Referring to FIG. 2, a data center system 200 includes a user 202, an alarm aggregation interface 204, an infrastructure management device 206, a communications network 208 and a set of physical infrastructure devices. Examples of physical infrastructure devices include generators, uninterruptible power supplies (UPSs), transformers, power distribution units (PDUs), outlets, computer room air handlers (CRAHs), rack-mounted air conditioners (RMACs), computer room air conditioners (CRACs), environmental sensors, such as temperature, humidity and airflow sensors, and security devices, such as security cameras, door contact sensors and the like. While physical infrastructure devices may include enough computing resources to control the operation of the physical infrastructure device, these computing resources may be limited and tailored to support the operation of the physical infrastructure devices. In at least one example, these limited computer resources may be disposed upon a Network Management Card (NMC) such as a UPS NMC available from APC by Schneider Electric. The particular physical infrastructure devices shown in FIG. 2 include a PDU 210, a CRAH 212, a CRAC 214, a UPS 216 and a RMAC 218, and a sensor device 220.

Referring to FIG. 3, a SCADA system 300 includes a user 202, an alarm aggregation interface 204, an infrastructure management device 206, a communications network 208, and a set of physical infrastructure subsystems 302. In at least one example, the SCADA system 300 includes a PowerSCADA system available from Schneider Electric. Each physical infrastructure subsystem includes multiple subcomponents. Examples of subcomponents included within physical infrastructure subsystems include generators, uninterruptible power supplies (UPSs), programmable logic controllers (PLCs), electrical meters, transformers, power distribution units (PDUs), remote terminal units (RTUs), power factor correction devices (PFCs), such as capacitor banks, electrical power sensors, environmental sensors, such as temperature, humidity and airflow sensors, and various security devices, such as those mentioned above. Similar to the discussion of FIG. 2 above, while the subsystems and subcomponents of an overall physical infrastructure may also include enough computing resources to control operation of individual physical infrastructure devices, the computing resources of any one component may be limited and tailored to support the operation of the associated subcomponent or subsystem. In at least one example, these limited computer resources may be disposed upon a PLC or programmable utility meter as available from Schneider Electric. The particular physical infrastructure subcomponents shown in FIG. 3 for a given subsystem include a RTU 304, a sensor device 306, a UPS 308, a PDU 310, and a PFC Device 312. A particular instance of an infrastructure management device 206 may be connected through a network 208 to multiple subsystems 302. As will be described more fully below, each of these subsystems 302 may branch out to connect to one or more additional subsystems, creating a hierarchy of electrical power and data distribution.

Each of the physical infrastructure devices shown in FIG. 2 and FIG. 3 may transmit event information via the network 208 to the infrastructure management device 206. The network 208 may be, among other types of networks, a private network (such as a LAN, WAN, extranet or intranet) or may be a public network (such as the internet). In the example shown, the network 208 is a LAN.

The event information transmitted via the network 208 may include any information regarding the operations of the physical infrastructure devices or information regarding the operating environment of the physical infrastructure devices. For example, the sensor device 220 may be an environmental sensor that provides information regarding ambient conditions near the sensor device 220, such as the NetBotz® device available from APC by Schneider Electric. In other examples, the sensor 306 may be an electrical power meter measuring voltages and currents present in the subcomponents of a particular subsystem. In each of these examples, the infrastructure management device 206 includes elements configured to receive the event information and to generate alarms based on this event information.

Figure 12:
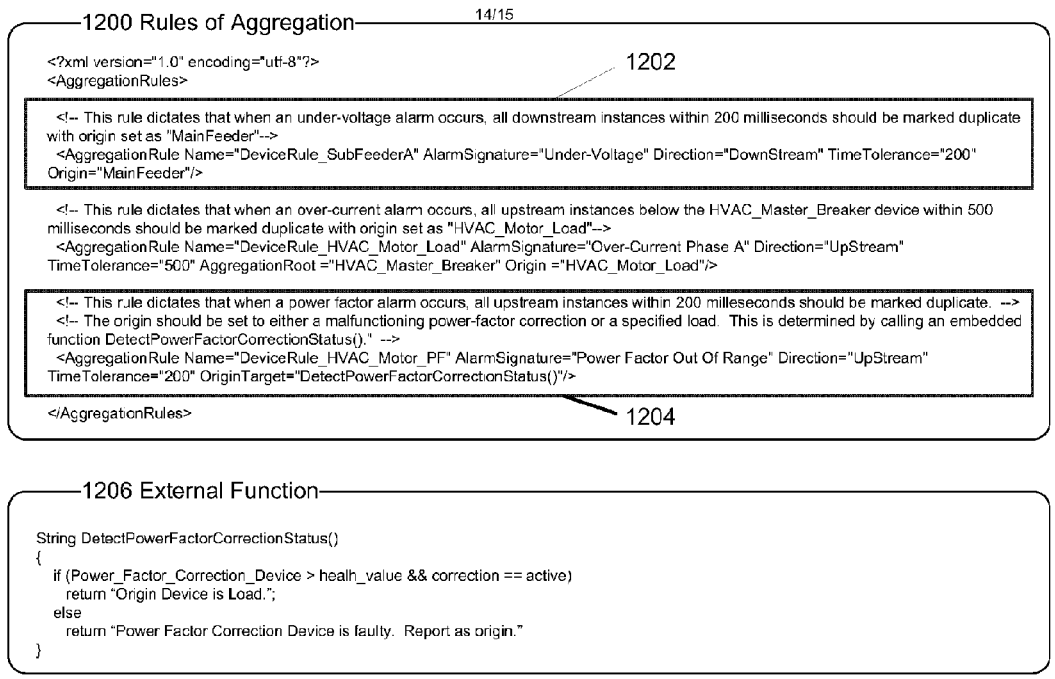
FIG. 12 is a textual rendering of an alarm aggregation rule including a reference to an external function.

In one example, the systems 200 and 300 are configured to present the alarm aggregation interface 204 to an external entity, such as the user 202. The alarm aggregation interface 204 includes elements configured to create, store, modify, delete or otherwise configure alarm aggregation rules, electrical distribution (ED) hierarchy definitions, data distribution (DD) hierarchy definitions, and notification policies. An ED hierarchy is a codified description of the topology of an electrical network consisting of multiple electrical devices, such as the subcomponents of a SCADA system described above, as well as the connectivity relationships between subcomponents. FIG. 12 presents an example of an ED hierarchy codified in XML format. Similarly, a DD hierarchy is a codified description of the topology of a computing network consisting of multiple physical devices, such as servers, routers, switches, network cards, and power supplies, as well as logical devices such as applications, network interfaces, databases, files, and file systems. In addition, the alarm aggregation interface 204 includes elements configured to search and present triggered aggregated alarms to the external entity. In at least one example, the alarm aggregation interface 204 is a browser-based user interface served and rendered by the infrastructure management device 206. In other examples, other suitable user and system interfacing technologies may be used. Thus, according to a variety of examples, the alarm aggregation interface 204 may include a plurality of individual interfaces that provide for configuration and review of aggregated alarm rule definitions, ED and DD hierarchy definitions, notification polices and aggregated alarms.

According to various examples, an aggregated alarm rule defines one or more characteristics of an aggregated alarm that is generated when the infrastructure management device 206 generates or detects a member of an alarm group associated with the aggregated alarm. Example characteristics of an aggregated alarm that may be configured via an aggregated alarm rule include a description, a root cause, severity, and recommended response. In some of these examples, the aggregated alarm also specifies the members of the alarm group that is associated with the aggregated alarm. In these examples, an alarm group may include one or more alarms with one or more common attributes. The common attributes that may be used to form the alarm group include both physical and logical attributes. Physical attributes may include a physical location (such as a particular rack, row, room, or building of a data center or a neighborhood, block, substation, or component of a power distribution system, etc.) of the subcomponent reporting event information that triggers an alarm. Other physical attributes may include power indicators (such as current voltages or currents) present at a particular subcomponent reporting event information that triggers an alarm. Logical attributes may include an identifier of a reporting device or membership of the reporting device in a logical group, such as an arbitrary user-assigned device group, a network segment, power path group, cooling zone group, capacity group or device functional type. Logical attributes may also include the content, or type, of the alarm, and the time the alarm was reported or initiated. Examples of the alarm content include, among others, severity, temperature, humidity, airflow information, contact sensor information, power information, network connectivity information, device error or failure information, motion detection information and sound detection information.

Also, in these examples, a notification policy defines the manner in which an external entity, such as the user 202 or a separate system, will be provided one or more aggregated alarms generated via one or more alarm aggregation rules. Example delivery methods for aggregated alarms include, among others, email, FTP, HTTP and SNMP. Examples of aggregated alarms and notification policies are discussed further below.

As shown in FIG. 2, the infrastructure management device 206 presents the alarm aggregation interface 204 to the user 202. An infrastructure management device is a specialized computing device engineered to provide infrastructure design, monitoring and configuration services. According to one example, the infrastructure management device 206 is an InfraStruXure® Central Server device available from APC by Schneider Electric. As illustrated, the infrastructure management device 206 may exchange or store information with the physical infrastructure devices and the sensor device 220 via the network 208. This information may include any information required to support the features and functions of the infrastructure management device 206. For example, this information may include event information which is further processed by the infrastructure management device 206 into alarms and aggregated alarms.

According to various examples, the infrastructure management device 206 includes elements configured to produce a variety of aggregated alarms. In one example, the infrastructure management device 206 can create an aggregated alarm that collects environmental and temporal information provided by several alarms into a single aggregated alarm. For instance, a user may wish to be notified of the source of an electrical anomaly that is present in the system, as well as the hierarchical relationship between the source of the anomaly and all other coupled subcomponents also reporting an anomalous state. Given this goal, the system can define an alarm aggregation rule based on an input ED hierarchy provided to the system, as well as characteristics of matching anomalies, such as power factor anomalies, that might be present on multiple coupled components. In addition, the system or a user can configure this aggregated alarm to provide a suggested root cause of the alarm such as, "Failing transformer 31 causing system overload in area 52, currently affecting coupled sectors 52.1-52.45."

In another example, the infrastructure management device 206 is configured to implement aggregated alarms that prevent overly repetitious reporting of alarms. In this example, the infrastructure management device 206 implements an aggregated alarm that combines, into one or more aggregated alarms, individual alarms that occur during a specified time window and that are initiated by members of a particular logical or physical grouping of physical infrastructure devices. For instance, the infrastructure management device 206 can be configured with an aggregated alarm that combines all alarms that are initiated within a 90 second window from a particular room of a data center.

In another example, the infrastructure management device 206 includes elements configured to provide notifications of aggregated alarms according to a notification policy. In this example, the infrastructure management device 206 exposes an interface through which the user 202 can configure notification policies. Once these notification policies are configured and associated with one or more aggregated alarms, the infrastructure management device 206 can deliver aggregated alarms according to the applicable notification policies. Thus examples of the infrastructure management device 206 allow users to configure aggregated alarms that provide more targeted and meaningful information than conventional monitoring and alarm systems.

Information, including aggregated alarms and notification policies, may be stored on the infrastructure management device 206 in any logical construction capable of storing information on a computer readable medium including, among other structures, flat files, indexed files, hierarchical databases, relational databases or object oriented databases. The data may be modeled using unique and foreign key relationships and indexes. The unique and foreign key relationships and indexes may be established between the various fields and tables to ensure both data integrity and data interchange performance.

Example System Architecture

Figure 4:
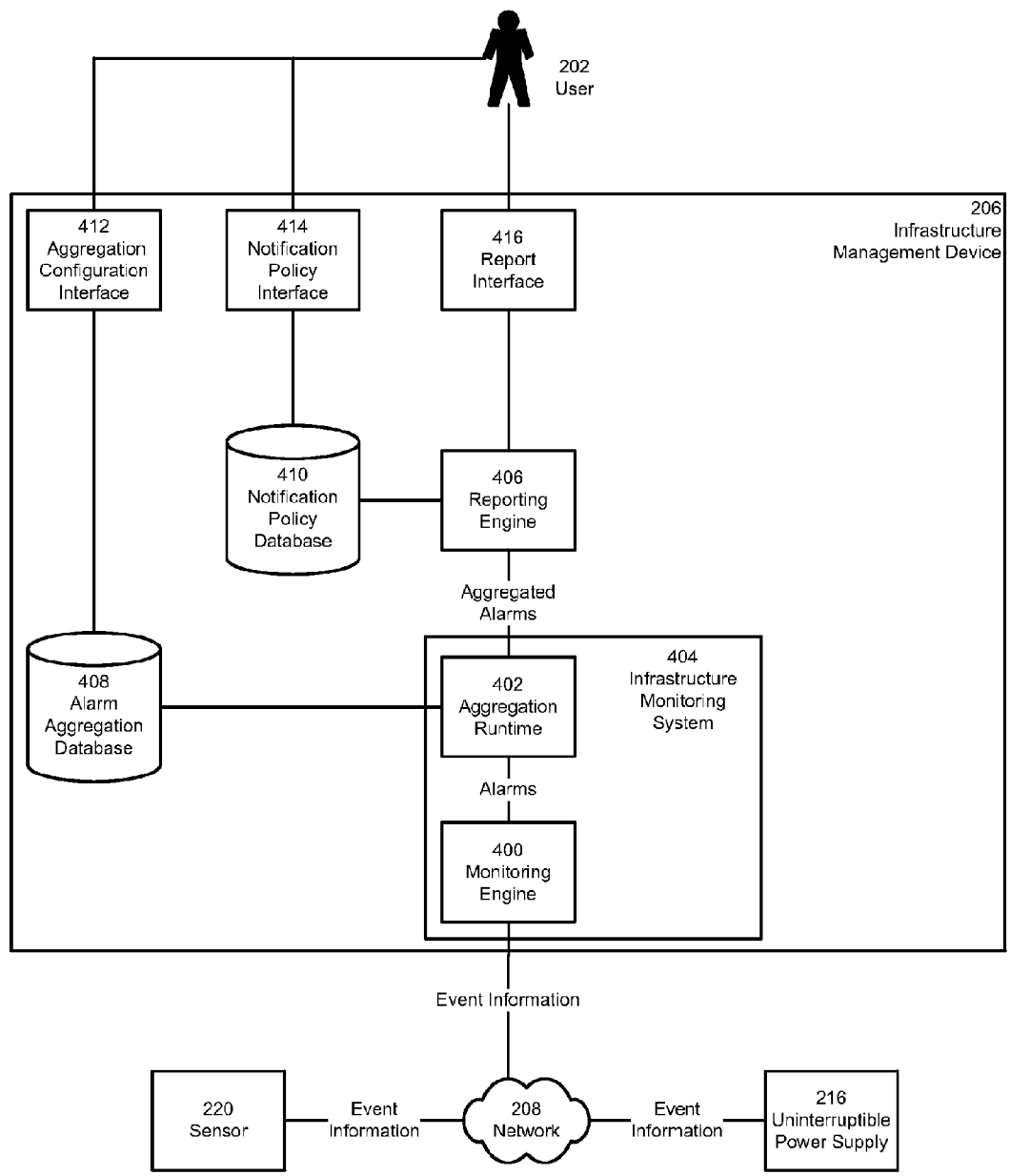
FIG. 4 is a block diagram of an infrastructure management device in accord with embodiments disclosed herein.
Figure 5:
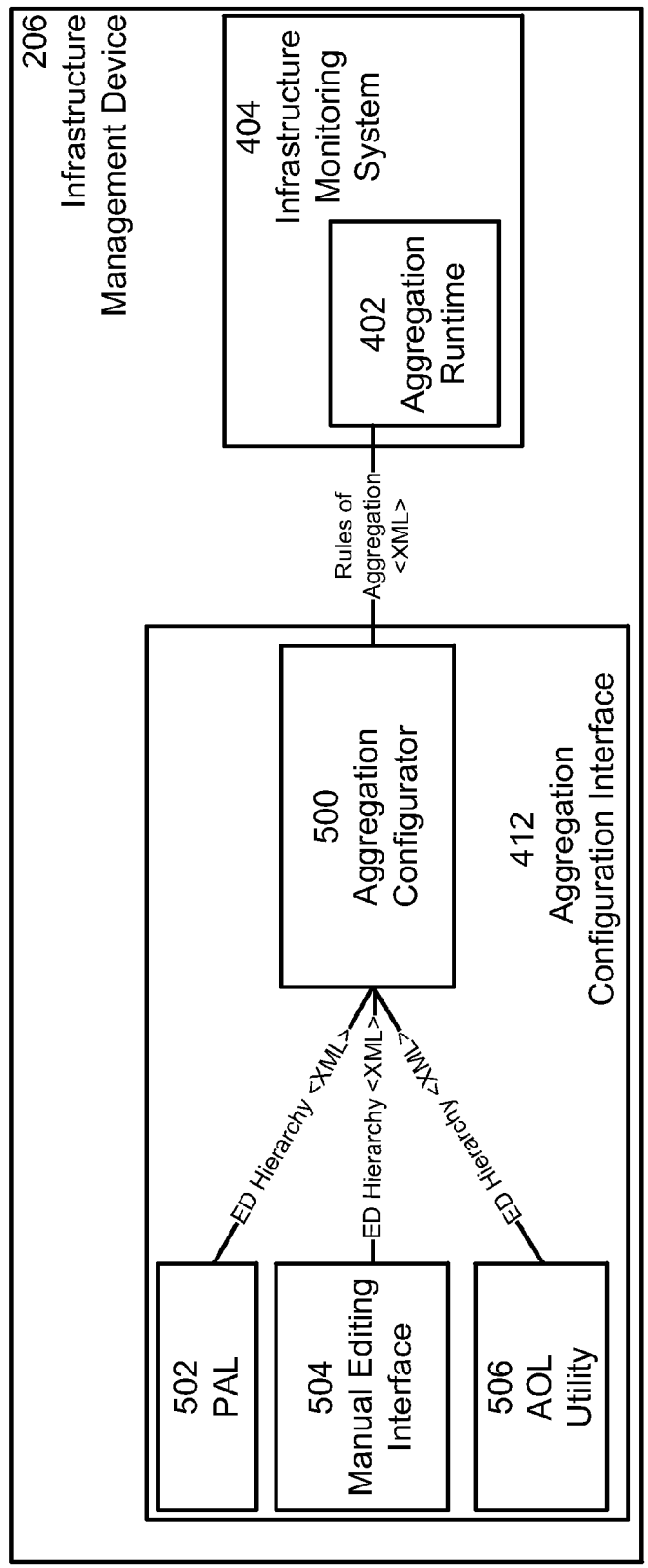
FIG. 5 is a flow chart of an example process for aggregating alarms in accord with aspects disclosed herein.

FIG. 4 and FIG. 5 provide a more detailed illustration of a particular physical and logical configuration of the infrastructure management device 206. The system structure and content discussed below are for exemplary purposes only and are not intended to limit examples to the specific structure shown in FIG. 4 and FIG. 5. As will be apparent to one of ordinary skill in the art, many variant exemplary system structures can be architected. The particular arrangement presented in FIG. 4 and FIG. 5 was chosen to promote clarity.

In the example shown in FIG. 4, the infrastructure management device 206 includes a monitoring engine 400 and an aggregation runtime 402 that are part of an infrastructure monitoring system 404, a reporting engine 406, an alarm aggregation database 408, a notification policy database 410, an aggregation configuration interface 412, a notification policy interface 414 and a report interface 416. As shown, the aggregation configuration interface 412 exchanges configuration information pertaining to hierarchies (e.g., ED or DD hierarchies) and alarm aggregation rule definitions with external entities such as the user 202 and the alarm aggregation database 408. The aggregation configuration interface also consists of subcomponents explained below in reference to FIG. 5. The notification policy interface 414 exchanges configuration information relevant to notification policies with external entities and the notification policy database 410. The reporting interface 416 exchanges alarm reporting information with external entities and the reporting engine 406.

Continuing the example illustrated in FIG. 4, the reporting engine 406 exchanges alarm reporting information with the notification policy database 410 and the reporting interface 416. In addition, the reporting engine 406 exchanges aggregated alarm information with the aggregation runtime 302. The aggregation runtime 302 exchanges aggregated alarm rule information with the alarm aggregation database 408, aggregated alarm information with the reporting engine 406 and alarm information with the monitoring engine 400. The monitoring engine 400 exchanges alarm information with the aggregation runtime 402 and event information with external event reporting physical infrastructure devices such as UPS 216 and sensor device 220 via the network 208.

In the example depicted in FIG. 4, the alarm aggregation database 408 includes elements configured to store and retrieve alarm aggregation rule information. In general, this alarm aggregation rule information may include any information that specifies how alarms should be combined into aggregated alarms. According to one example, alarm aggregation rule information includes, among other information, information regarding the alarm aggregation rule itself and information regarding the aggregated alarms produced via the alarm aggregation rule. In this example, the information regarding the alarm aggregation rule itself includes, among other information, an alarm aggregation rule identifier (such as a unique number), an alarm aggregation rule name, an alarm aggregation rule definition, an alarm aggregation rule description, information descriptive of a type of hierarchy associated with the alarm aggregation rule (e.g., an ED or DD), and one or more alarm types to which the aggregated alarm rule applies. In some embodiments, the alarm aggregation rule definition specifies the method in which the alarms are aggregated. The alarm aggregation rule definition may vary based on the type of alarm aggregation rule. In one example, the aggregation rule definition is stored in the form of one or more logical implications, for example "if X then Y" statements. Some illustrative examples of these operations are described further below in the Example Alarm Aggregation Rules section. Additionally, in this example, the information regarding the aggregated alarms generated via the alarm aggregation rule includes, among other information, a severity for the aggregated alarm, one or more recommended responses to the aggregated alarm, one or more origin nodes for the aggregated alarm, and one or more potential root causes for the aggregated alarm.

Continuing the example depicted in FIG. 4, the notification policy database 410 includes elements configured to store and retrieve notification policy information. In general, this notification policy information may include any information that specifies how aggregated alarms should be reported. According to one example, notification policy information includes, among other information, information regarding the notification policy itself and information regarding the notifications produced via the notification policy. In this example, the information about the notification policy itself includes, among other information, a notification policy identifier (such as a unique number), a notification policy name, a notification policy description and one or more aggregated alarms to which the notification policy applies. Additionally, in this example, the information regarding the notifications includes the content and format of the notification, an identifier of one or more external entities, such as a user or external system, to whom the aggregated alarm should be sent and a communication method, such as an email or inter-process communication, that should be used to notify the external entity.

The databases 408 and 410 may take the form of any logical construction capable of storing information on a computer readable medium including flat files, indexed files, hierarchical databases, relational databases or object oriented databases. In addition, links, pointers, indicators and other references to data may be stored in place, of or in addition to, actual copies of the data. The data may be modeled using unique and foreign key relationships and indexes. The unique and foreign key relationships and indexes may be established between the various fields and tables to ensure both data integrity and data interchange performance.

Furthermore, the structure and content of each of these various fields and tables depends on the type of data stored therein. Thus, in at least one example, the data structures and objects used to store the notification policy information differ from the data structures and objects used to store the alarm aggregation and alarm aggregation rule policy information. Consequently, in this example, any process that accesses this data must be specially configured to account for the type of data accessed.

As depicted in FIG. 4, the infrastructure management device 206 exposes several interfaces to exchange data with external entities. More particularly, in the example shown, the aggregation configuration interface 412, the notification policy interface 414 and the report interface 416 exchange information with the user 202. Also, in the example shown, the monitoring engine 400 exchanges information with the sensor 220 and the UPS 216 via the network 208. In various examples, the interfaces 412, 414 and 416 employ a wide variety of technologies, user interface elements and interface metaphors to exchange information with external entities, such as the user 202.

In one example, the aggregation configuration interface 412 includes elements configured to exchange alarm aggregation rule information with the user 202. More particularly, in this example, the aggregation configuration interface 412 is arranged to allow the user 202 to search, create, modify, delete or otherwise configure hierarchy information (e.g. information descriptive of an ED or DD hierarchy) and alarm aggregation rules. In some embodiments, the aggregation configuration interface may incorporate functionality for producing ED and DD hierarchy information. Example applications used for the production of ED hierarchy information include an Advanced One Line (AOL) utility program, such as the program described in PCT Application Serial Number. PCT/US2013/024890, entitled "GENERATING ONE-LINE ELECTRICAL NETWORK DIAGRAMS," ("the '890 application") which is hereby incorporated herein by reference in its entirety. A second example application used for the production of ED hierarchy information include functionality for discovering the layout of an ED system by observing a collection of historical electrical data, such as described in U.S. Pat. No. 8,184,016 B2, entitled "GRAPHICAL REPRESENTATION OF UTILITY MONITORING SYSTEM HAVING MULTIPLE MONITORING POINTS," ("the '016 patent") which is hereby incorporated herein by reference in its entirety. Such as the functionality provided by the "ProActive Logic" (PAL) system by Schneider Electric. As shown in FIG. 5, the aggregation configuration interface is also configured with PAL 502 utilities, manual editing functionality 504, and AOL 506 utilities that accept or create hierarchy information to be used by an incorporated aggregation configurator 500 programmed to create alarm aggregation rules. In addition, in this example, the aggregation configuration interface 412 is arranged to store the alarm aggregation rule information in, or retrieve the alarm aggregation rule information from, the alarm aggregation database 408.

In another example, the notification policy interface 414 includes elements configured to exchange notification policy information with the user 202. More particularly, in this example, the notification policy interface 414 is arranged to allow the user 202 to search, create, modify, delete or otherwise configure notification policy information. In addition, in this example, the notification policy interface 414 is arranged to store the notification policy information in, or retrieve the notification policy information from, the notification policy database 410.

In another example, the report interface 416 includes elements configured to exchange report information with the reporting engine 406 and one or more external entities. More particularly, in the example shown in FIG. 4, the report interface 416 is configured to allow the user 202 to search and review report information generated by the reporting engine 406. This reporting information may include any data pertinent to one or more aggregated alarms triggered by the aggregation runtime 402. For instance, in one example, the reporting interface 416 can allow a user to drill-down through aggregated alarms to review the individual alarms that are combined under the aggregated alarms. In addition, the reporting interface 416 may exchange report information using a variety of notification conduits such as email, HTTP, FTP, SNMP, among others.

Each of the interfaces disclosed herein exchange information with various providers and consumers. These providers and consumers may include any external entity including, among other entities, users and systems. In addition, each of the interfaces disclosed herein may both restrict input to a predefined set of values and validate any information entered prior to using the information or providing the information to other components. Additionally, each of the interfaces disclosed herein may validate the identity of an external entity prior to, or during, interaction with the external entity. These functions may prevent the introduction of erroneous data into the system or unauthorized access to the system.

In the example shown in FIG. 4, the monitoring engine 400 includes elements configured to receive event information from the network 208. As illustrated, this event information may be provided by a variety of physical infrastructure devices, such as the sensor 220 and the UPS 216. The monitoring engine 400 is configured to determine if inbound event information warrants triggering one or more alarms and further to transmit information regarding triggered alarms to the aggregation runtime 402.

Continuing the example of FIG. 4, the alarms generated by the monitoring engine 400 can provide a wide range of information. For instance, the alarms can indicate internal device errors, such as a hard drive being full or failing. In addition, alarms can be triggered based on a comparison between one or more threshold values and information transmitted by a sensor. In some cases, the one or more threshold values may be specified by an external entity, such as a user. Examples of the types of information that a sensor may transmit include airflow information, audio information, power information (such as amps, watts, voltage, power factor and VA), dew point, humidity information, temperature and state information (door open/closed, camera motion detected, dry contact open/closed, etc). The comparisons that can be made between sensor and threshold values include whether: the sensor value exceeds the threshold value, the sensor value is below the threshold value, the sensor value falls between two threshold values, the sensor value has changed at rate equal to or greater than the threshold value, and for state sensors, whether the threshold state equals, or does not equal, the sensor state. Moreover, the comparison may consider the amount of time the tested-for relationship persists, i.e. whether the relationship has lasted longer than a specified duration.

According to the example in FIG. 4, the aggregation runtime 402 includes elements configured to generate aggregated alarms. More specifically, in this example, the aggregation runtime 402 is configured to receive alarm information and to retrieve, using the alarm information, potentially applicable alarm aggregation rules information from the alarm aggregation database 408. In one example, the alarm aggregation database 408 is indexed according to alarm aggregation rule name, thereby providing efficient access to alarm aggregation rule information associated with one or more types of alarms.

Continuing the example illustrated in FIG. 4, the reporting engine 406 includes elements configured to report aggregated alarms. More specifically, in this example, the reporting engine 406 is configured to receive aggregated alarm information and to retrieve, using the aggregated alarm information, applicable notification policy information from the notification policy database 410. In one example, the notification policy database 410 is indexed according to aggregated alarm type, thereby providing efficient access to notification policy information associated with one or more types of aggregated alarms.

In this example, the reporting engine 406 includes elements configured to analyze and apply one or more rules included in the notification policies. These rules may define the actions taken to report aggregated alarms. In one example, the rules are stored in the form of logical implications, for example "if X then Y" statements as discussed above with regard to alarm aggregation rules. In this example, the reporting engine 406 is configured to use these rules to determine the conduit of communication used to transmit notifications to external entities. According to various examples, any conduit through which computers may exchange information may be used. Some such conduits include email, FTP, HTTP, SNMP and many forms of inter-process communication, such as remote procedure calls and web service calls. In addition, according to some examples, the reporting engine 406 is configured to report aggregated alarms to a variety of computing platforms such as desktops, laptops and mobile computing devices. Thus the reporting engine 406 provides flexible facilities that allow for reporting of aggregated alarms via a variety of communications paths and techniques.

Alarm Aggregation Processes

Figure 6:
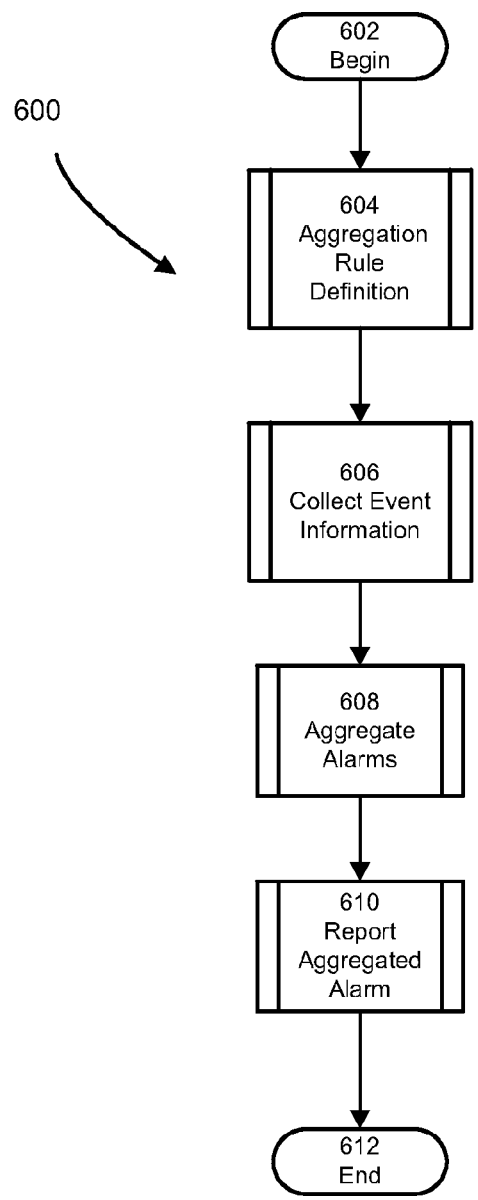
FIG. 6 is a flow chart of an example process for defining alarm aggregation rules in accord with aspects disclosed herein.

Various examples provide processes for automated aggregation rule definition and aggregation of the alarms generated from event information received via a network connecting various physical infrastructure devices. FIG. 6 illustrates one such process 600 that includes acts of defining aggregation rules, receiving event information, aggregating alarm information and reporting an aggregated alarm to an external entity. In at least one example in accord with FIG. 6, an infrastructure management device arranged and configured as the infrastructure management device 206 executes the acts included process 600. Process 600 begins at 602.

In act 604, alarm aggregation rules are defined. According to various examples, an infrastructure management device receives hierarchy information, such as information descriptive of an ED or DD hierarchy, via automated processes, such as AOL or PAL utility, or via a manual entry process from user 202. In these examples, the infrastructure management device uses the hierarchy information to automatically generate aggregation rule definitions. Acts in accord with these examples are discussed below with reference to FIG. 7.

In act 606, event information is collected. According to various examples, a infrastructure management device collects the alarm information via a monitoring engine, such as the monitoring engine 400. Acts in accord with these examples are discussed below with reference to FIG. 8.

In act 608, alarm information is aggregated. According to some examples, an infrastructure management device aggregates the alarm information via an aggregation runtime, such as the aggregation runtime 302. Acts in accord with these examples are discussed below with reference to FIG. 9.

In act 610, aggregated alarm information is reported to an external entity. According to several examples, an infrastructure management device provides the aggregated alarm information to an external entity via a reporting engine, such as the reporting engine 406. Acts in accord with these examples are discussed below with reference to FIG. 10.

Process 600 ends at 612. Automated aggregation rule definition and alarm aggregation processes in accord with process 600 increase the relevance of alarms issued from an infrastructure management device. Thus processes like process 600 provide more useful notifications to users than do conventional alarm processes.

Figure 7:
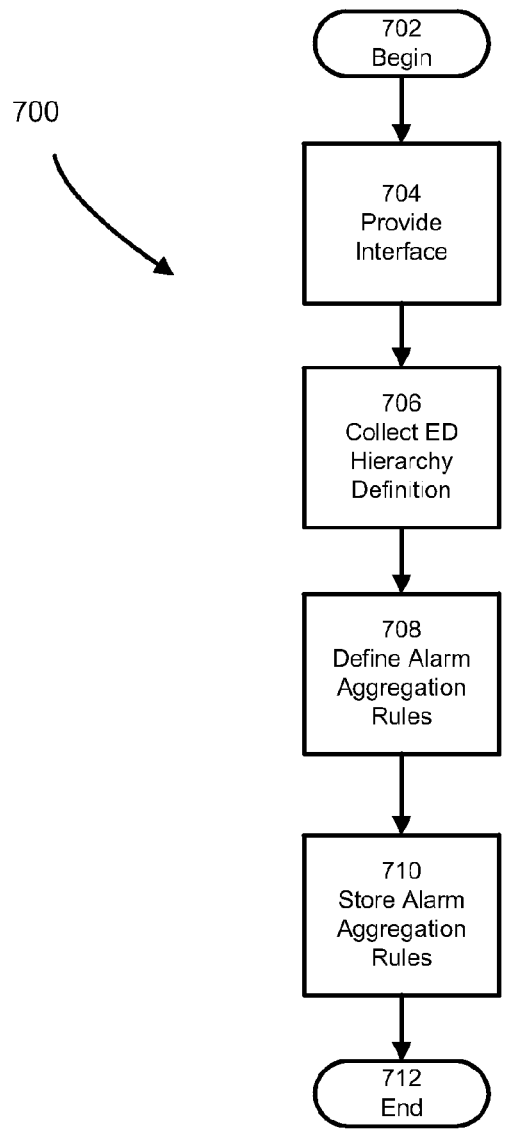
FIG. 7 is a flow chart of an example process for collecting event information in accord with aspects of disclosed herein.

As discussed above with regard to act 604 shown in FIG. 6, various examples provide processes for defining alarm aggregation rules. FIG. 7 illustrates one such process 700 that includes acts of providing an interface, collecting hierarchy information, defining alarm aggregation rules in an automated fashion, and storing alarm aggregation rules. Process 700 begins at 702.

In act 704, an infrastructure management device provides an interface through which the infrastructure management device may receive hierarchy information (such as ED or DD hierarchy information) and component definitions that describe the various subsystems, subcomponents and coupling between those systems and components. In at least one example, the infrastructure management device performing this action exposes a system interface via a network, such as the network 208 to a remote computing system that stores this ED or DD hierarchy definition information or is executing an AOL 502 or PAL 506 utility that provides can provide this information. Example ED hierarchy information as provided by a PAL utility is provided in FIG. 13. In a separate example, the infrastructure management device performing this action may load ED or DD hierarchy information for the distributed system being monitored from storage, such as data storage 118, or may receive this hierarchy information from an AOL 502 or PAL 506 utility executing locally on the processor 110. In a further example, the hierarchy information may be received from a user 202 through a manual editing interface 504 within the aggregation configuration interface 412 of an infrastructure management device 206. In act 706, an infrastructure management device receives ED or DD hierarchy information from one or more local or remote computer systems via the interface provided in act 704.

In act 708, an aggregation configurator component 500 of the infrastructure management device executes a process to define alarm aggregation rules based on a system's hierarchy information and information descriptive of possible physical or logical states for each of the components in the hierarchy defined by the hierarch information. The functionality used in creating alarm aggregation rules as well as examples of alarm aggregation rules are described in more detail below in discussion related to FIG. 11A-C, FIG. 12, and FIG. 13.

In act 710, the infrastructure management device stores alarm aggregation rules in local storage, such as data storage 118.

Figure 8:
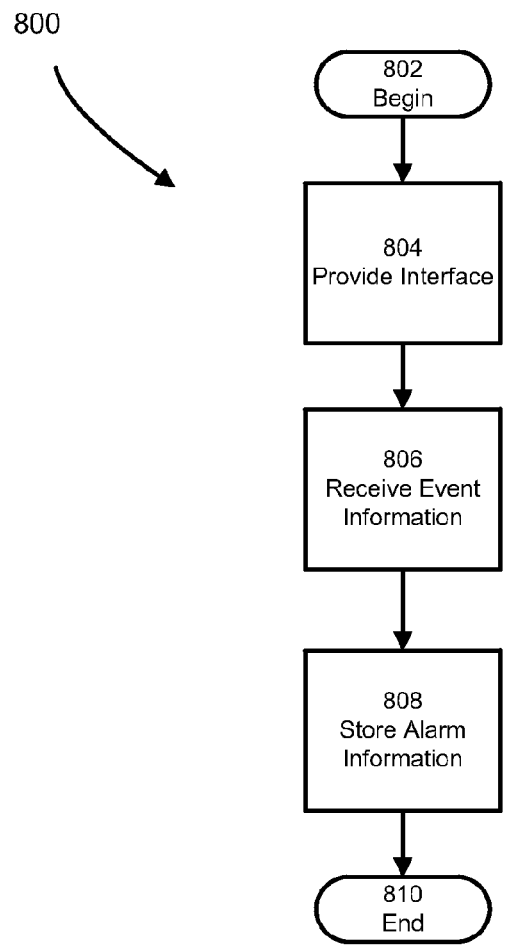
FIG. 8 is a flow chart of an example process for applying alarm aggregation rules in accord with aspects of disclosed herein.

As discussed above with regard to act 606 shown in FIG. 6, various examples provide processes for receiving event information. FIG. 8 illustrates one such process 800 that includes acts of providing an interface, receiving event information and storing alarm information. Process 800 begins at 802.

In act 804, an infrastructure management device provides an interface through which the infrastructure management device may receive alarm information. In at least one example, the infrastructure management device performing this action exposes a system interface via a network, such as the network 208, to physical infrastructure devices, such as the UPS 216 and the sensor 220. In act 806, an infrastructure management device receives event information from one or more physical infrastructure devices via the interface provided in act 804. In one example, the infrastructure management device analyzes the event information to determine if the event information warrants issuing an alarm and, if so, creates alarm information. In act 808, the infrastructure management device stores the alarm information in local storage, such as data storage 118.

Process 800 ends at 810. Various examples in accord with the process 800 enable infrastructure management devices to gather alarm information for later aggregation and reporting.

Figure 9:
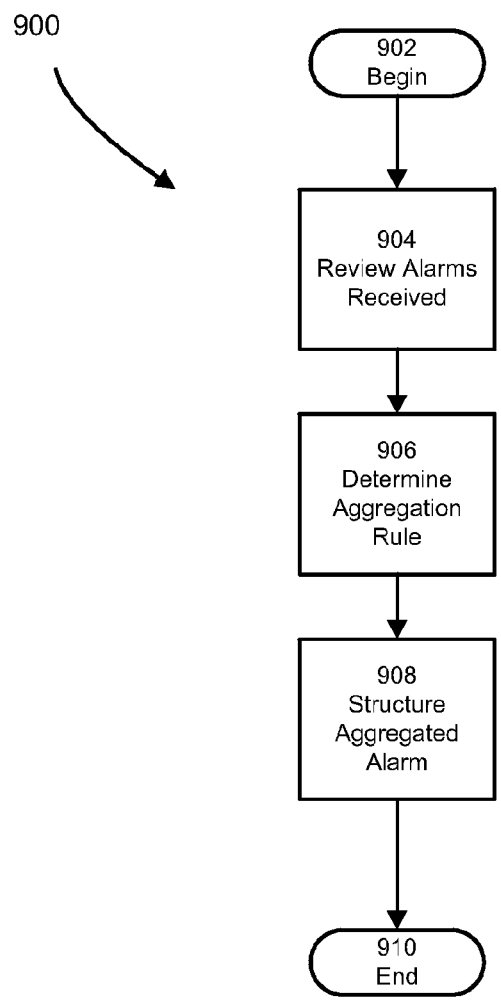
FIG. 9 is a flow chart of an example process for reporting aggregated alarms in accord with aspects of disclosed herein.

As discussed above with regard to act 608 shown in FIG. 6, various examples provide processes for aggregating alarm information to produce aggregated alarms. FIG. 9 illustrates one such process 900 that includes acts of reviewing alarms received, determining applicable alarm aggregation rules and structuring and generating one or more aggregated alarms. Process 900 begins at 902.

In act 904, an infrastructure management device reviews locally stored alarm information and gathers potentially applicable aggregated alarm rules for further analysis. In one example, the infrastructure management device gathers the potentially applicable alarm aggregation rules from a database, such as alarm aggregation database 308. In this example, the infrastructure management device retrieves the potentially applicable consolidation filters from the database using information included in the stored alarm information.

In act 906, an infrastructure management device determines if the potentially applicable aggregated alarm rules actually apply to the reviewed alarm information. In one example, the infrastructure management device makes this determination by applying patterns included within the potentially applicable aggregated alarms to the reviewed alarm information. In act 908, the infrastructure management device generates aggregated alarms via any aggregated alarm rules that are applicable to the reviewed alarm information and structures and stores the aggregated alarm information in local storage, such as such as data storage 118.

Process 900 ends at 910. Processes in accord with the process 900 allow an infrastructure management device to review, filter and consolidate its alarm history into a highly relevant and useful set of aggregated alarms.

Figure 10:
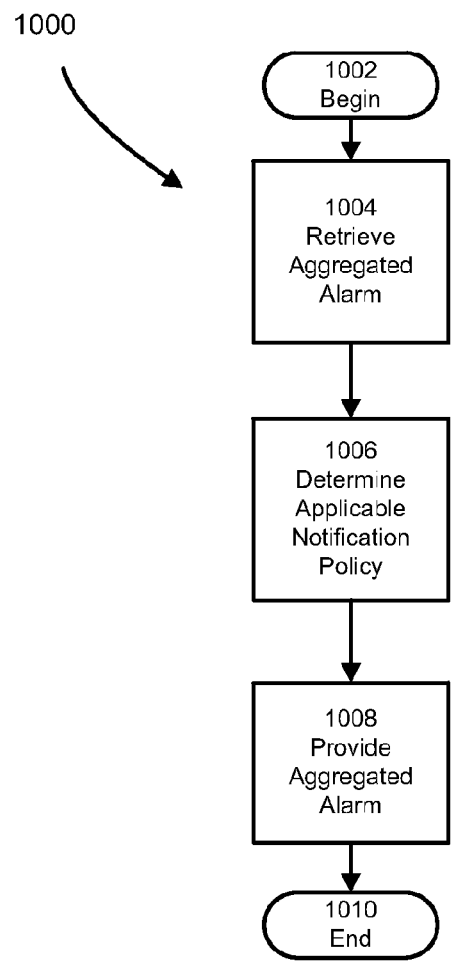
FIG. 10 is a block diagram of the components involved in the alarm aggregation rule definition and deployment process.

As discussed above with regard to act 610 shown in FIG. 6, various examples provide processes for a infrastructure management device to report aggregated alarms to external entities. FIG. 10 illustrates one such process 1000 that includes acts of retrieving aggregated alarms from local storage, determining notification policies that are applicable to the aggregated alarms and providing the aggregated alarms to external entities according the applicable notification policy. Process 1000 begins at 1002.

In act 1004, an infrastructure management device retrieves aggregated alarms. In one example, the infrastructure management device retrieves the aggregated alarms from local storage. In act 1006, the infrastructure management device determines notification policies that apply to the retrieved aggregated alarms. In one example, the infrastructure management device determines applicable notification policies by querying a notification policy database, such as the notification policy database 410, using aggregated alarm information. In act 1008, an infrastructure management device provides the aggregated alarms to external entities according to the applicable notification policy. In at least one example, the infrastructure management device provides the aggregated alarms to various users on a variety of computing platforms, such as workstations, laptops and mobile computing devices.

Process 1000 ends at 1010. Upon completion of process 1000, an infrastructure management device has successfully aggregated individual alarm instances into one or more aggregated alarms, thereby increasing the relevance of this alarm information. As discussed above, more relevant notifications allow external entities, such as field service technicians or data center technicians, to more efficiently address potential problems encountered within the physical infrastructure operating environment.

Each of processes 600 through 1000 depicts one particular sequence of acts in a particular example. The acts included in each of these processes may be performed by, or using, one or more infrastructure management devices as discussed herein. Some acts are optional and, as such, may be omitted in accord with one or more examples. Additionally, the order of acts can be altered, or other acts can be added, without departing from the scope of the apparatus and methods discussed herein. In addition, as discussed above, in at least one example, the acts are performed on a particular, specially configured machine, namely an infrastructure management device configured according to the examples disclosed herein.

Example Alarm Aggregation Rules

As described above with reference to the processes associated with FIG. 7, in some embodiments an infrastructure management device 206 provides functionality for the automated definition of alarm aggregation rules based on input hierarchy information. As described with reference to the system in FIG. 5, alarm aggregation rules created by an aggregation configurator 500 may be deployed into an aggregation runtime 402 for determining an appropriate aggregated alarm based upon a set of reported individual alarms.

Rules for aggregated alarms may exist in a variety forms based on the topology of the network system being monitored as well as the potential anomalous behavioral properties of physical or logical devices being measured by the alarm sensors at the nodes of the network. In some embodiments, the act of defining alarm aggregation rules might consist of performing various operations against a predefined lookup table. As an example of lookup operations performed when an alarm configurator 500 defines an alarm aggregation rule, for an "over-current" aggregated alarm rule signature, the alarm origin is generally considered to be "downstream" of all other alarm instances in the aggregated alarm. Defining the alarm aggregation rule would involve the aggregation configurator 500 using information of the new alarm rule signature being "over-current", performing a lookup for the general settings for "over-current" alarms, and then assigning a direction, signature, and origin value based on the ED hierarchy information provided as input to the operation.

Upon completion of the above rule definition operation, an alarm aggregation rule is created, such as the alarm aggregation rule 1202 shown in FIG. 12. In some embodiments, the definition of rules may also include instructions to call one or more function library routines to be executed at runtime upon application of an alarm aggregation rule. As an example of defining a rule with incorporation of an external function call, when defining an alarm aggregation rule related to power factor correction, such as rule 1204, the location of alarm origin might be determined based on a function 1206 that utilizes the value for power factor correction for a particular node, performs a health threshold operation based on the value received as well as check that a node's power factor correction device is active, and returns a description of the origin location.

Figure 11A:
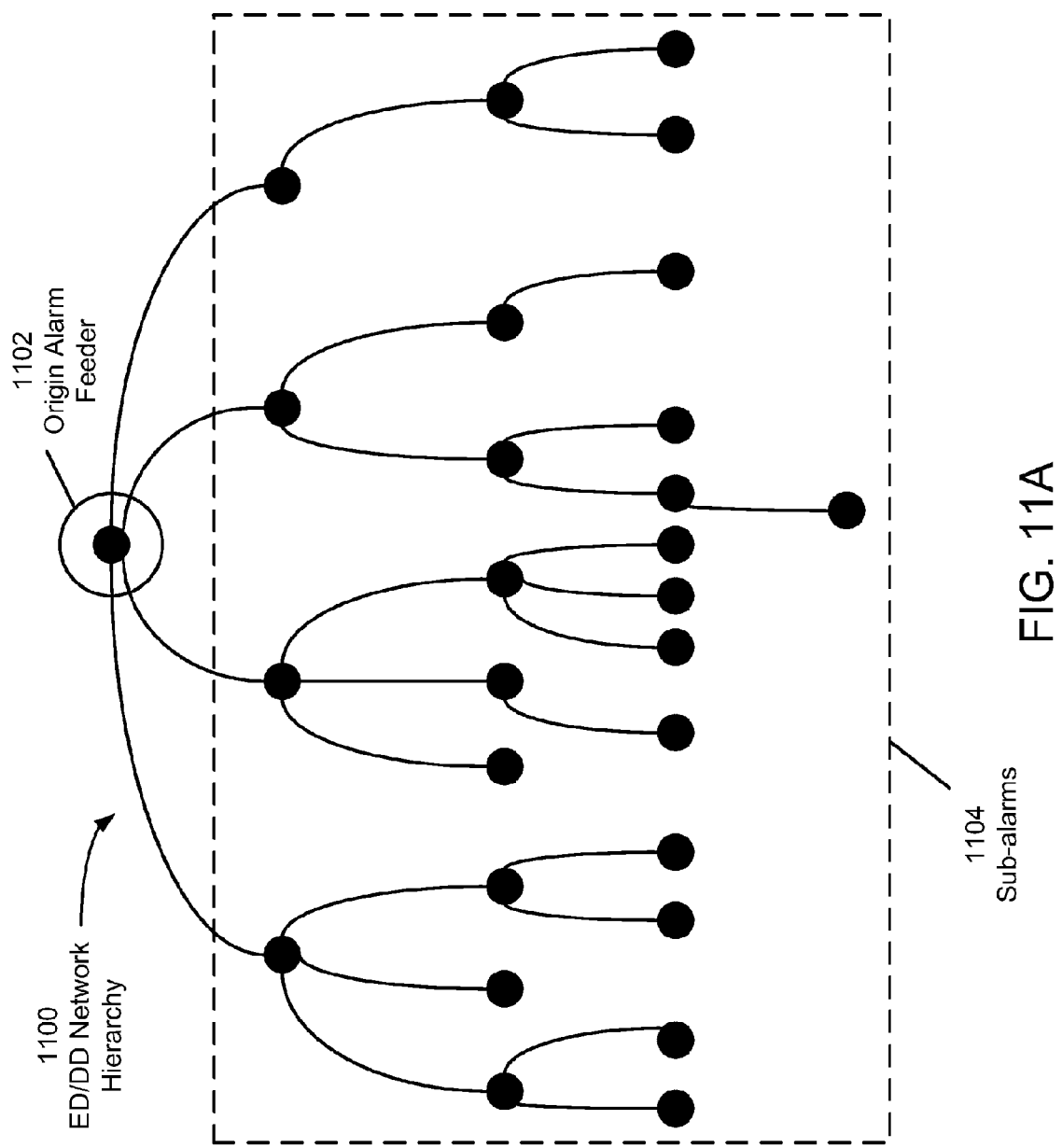
FIG. 11A is a diagram of an example alarm aggregation rule.

In one example shown in FIG. 11A, an ED network 1100 is depicted with a particular hierarchical dependence between nodes in the network. In this example, sensors at the individual network nodes are configured to measure the voltage between that node and its neighboring nodes. An under-voltage alarm can be triggered in a feeder meter of a network node if there is a utility or source problem. Similar alarms with an under-voltage signature would then be triggered at all network nodes that are downstream from the feeder node. The rule of aggregation in this example could be described in the following manner: "Given a collection of identical alarms within a specified time range, determine the alarm from the device at the highest point in the hierarchy (the feeder). Mark this alarm as the origin and mark all other alarms as sub-alarms. Mark the origin as 'upstream' on all instances of identical alarms." In FIG. 11A, a feeder node is highlighted as the origin 1102 at the highest point in the set of aggregated alarms, with all of the remaining nodes marked as sub-alarms 1102. The origin 1102 is marked as being upstream from all sub-alarms.

Figure 11B:
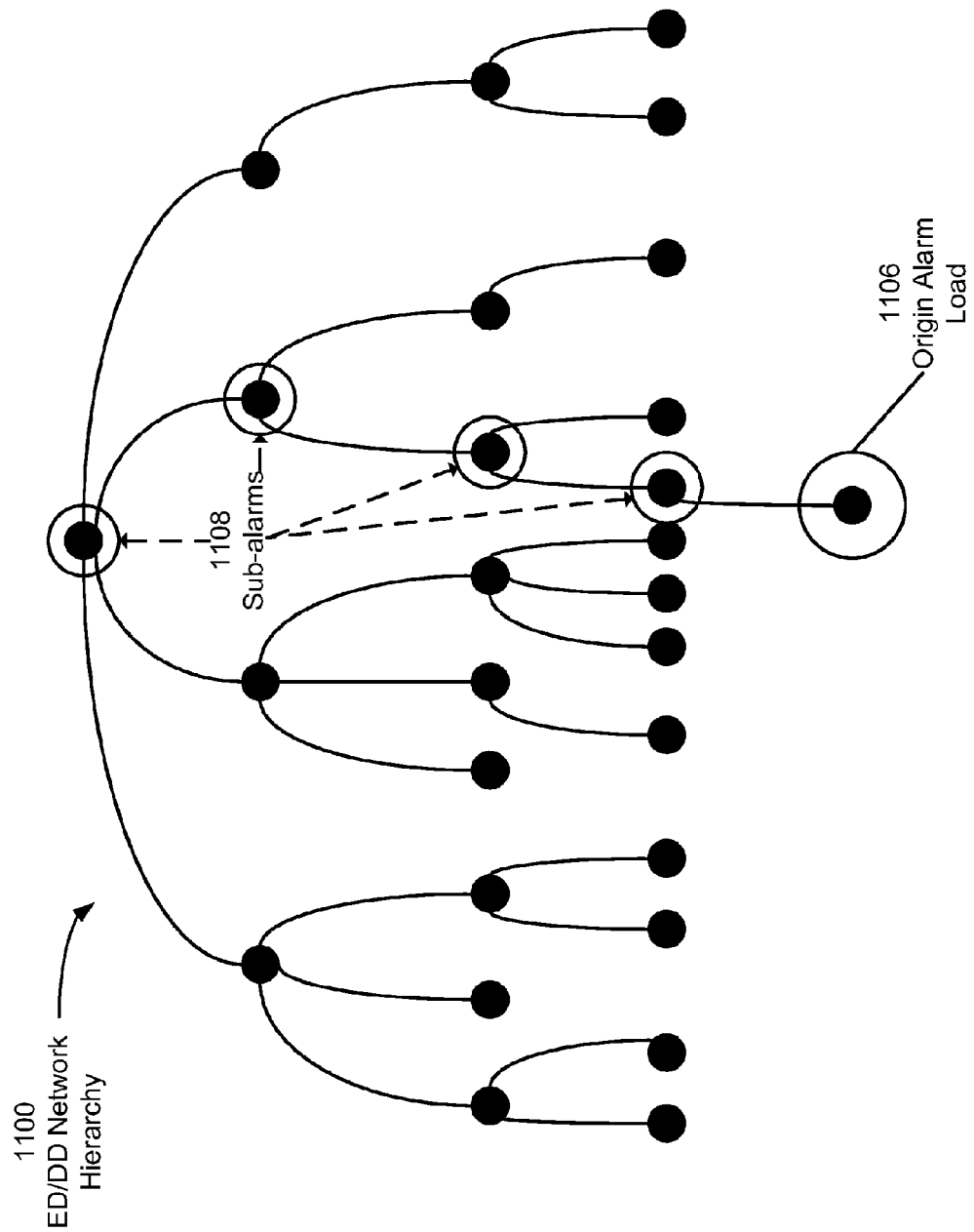
FIG. 11B is a diagram of another example alarm aggregation rule.

In a second example shown in FIG. 11B, an ED network 1100 is also depicted with a particular hierarchical dependence between nodes in the network. In this example, sensors at the individual network nodes are configured to measure the current passing through that node. An over-current alarm can be triggered in a scenario where a load, such as a motor, a light source, or a resistor, causes an over-current event. In this scenario, the node corresponding to this load would be at the bottom of the hierarchy with alarm triggered at each connected node n the hierarchy up to a protective device, such as a circuit breaker on a sub-feeder. In this scenario, a possible rule of aggregation might be expressed as, "Given a collection of identical alarms within a specified time range, determine the alarm at the lowest point in the hierarchy (the load). Mark this alarm as the origin and mark all other alarms as sub-alarms. Mark the origin as 'downstream' on all instances of identical alarms." In FIG. 11B, node 1106 is the network location of the load that is defined as the origin that is downstream from sub-alarms 1108 that are higher in the network hierarchy.

In a third example shown in FIG. 11C, a more complex aggregation rule is depicted. In this example, the nodes may contain sensors that measure a power factor, a ratio of the real power flowing to a load and the apparent power within a circuit, and contain power factor correction (PFC) devices, such as capacitor banks. When a power factor alarm is triggered, a user 202 is interested in the load that is causing the power factor issues as well as any PFC devices that are in the path which may also be issuing power factor alarms.

Power factor alarms may happen at any level in the network hierarchy, including above or below the PFC devices. A possible alarm aggregation rule for this scenario might be, "Given a collection of identical alarms within a specified time range, determine the alarm at the lowest point in the hierarchy (the load). In addition, take note of the real-time readings from any PFC devices in the ED hierarchy branch. If these readings are within tolerance (the PFC device is working correctly), the mark the load as the origin and mark all other alarms as sub-alarms. Mark the origin as "downstream" on all instances of identical alarms. If the PFC device(s) have abnormal readings, mark the offending PFC device(s) as origin(s) and mark all other alarms as sub-alarms. Mark the origin as downstream or upstream accordingly on all other identical alarms." In FIG. 11C, nodes 1110 are nodes that report an abnormal PFC reading and are marked as unique origins. In this example, nodes 1112 are nodes reporting alarms from which the origins are downstream and nodes 1114 are nodes reporting alarms from which the origins are upstream. As power factor is not a transient occurrence, additional context can be requested from the system related to this aggregated alarm after initial reporting. This example makes use of the non-transient nature of a power factor by requesting real-time data as part of the rule definition.

It is to be appreciated that any event detectable by a computer system may be analyzed to determine whether a device has entered an anomalous state. This event information may be subsequently used as the basis for an aggregated alarm where the event presents itself in multiple places within a set of devices. For example, there are over 4,000 quantities that can be extracted from sampling a 3-phase circuit. For each of these quantities (e.g., currents, voltages, harmonics and the like), an alarm could be configured and aggregated. Thus the embodiments disclosed herein may generate aggregation alarm rules based on many types of aggregation alarm rules not expressly disclosed herein. For instance, further examples of aggregated alarms rules include various types of consolidation filters as defined in co-pending U.S. patent application Ser. No. 12/700,665 entitled "ALARM CONSOLIDATION SYSTEM AND METHOD," (the '665 application") which is hereby incorporated by reference in its entirety.

Other types of event information that may be used as the basis for an aggregate alarm include WAGES topics (Water, Air, Gas, Electricity, and Steam). Thus, according to some embodiments, types of aggregated alarm rules utilize quantities measuring subjects other than electricity. For instance, within a water treatment system, an alarm may be triggered for low water pressure. The low water pressure could cause a cascade of alarms, but the origin device may be the water pump, which is at the top of the water device hierarchy. Thus, the aggregated alarm reporting these events may mark as duplicate all of the valves and checkpoints down stream of the origin water pump. If, however, one of the valves along the way reported a normal pressure, and the next downstream valve reported a low pressure, the value reporting the low pressure may be reported as the origin, as this could indicate a leaking pipe.

In some embodiments, a set of alarm aggregation rules generated for a particular ED or DD hierarchy can be stored in a resource file, such as an XML file. An example XML file containing sample versions of rules described above for a particular ED hierarchy is shown in FIG. 12. As different ED or DD hierarchies are passed as input to an aggregation configurator 500, unique instances of alarm aggregation rules are created for each of those ED or DD hierarchies. In some embodiments, an alarm aggregation rule or set of alarm aggregation rules for a particular ED or DD network hierarchy may be displayed on a display device as a graphical representation of that ED or DD network with an incorporated visual representation of the alarm aggregation rule.

Having now described some illustrative aspects, it should be apparent to those skilled in the art that the foregoing is merely illustrative and not limiting, having been presented by way of example only. Similarly, aspects may be used to achieve other objectives. For instance, in one example, instead of (or in addition to) reporting aggregated alarms, the infrastructure management device may take corrective action based on the generation of an aggregated alarm. In another instance, examples are used to monitor physical infrastructure devices that reside outside of a data center, such as devices in wiring closets, point-of-sale terminals and server rooms. Numerous modifications and other illustrative examples are within the scope of one of ordinary skill in the art and are contemplated as falling within the scope of the apparatus and methods disclosed herein. In particular, although many of the examples presented herein involve specific combinations of method acts or system elements, it should be understood that those acts and those elements may be combined in other ways to accomplish the same objectives.

What is claimed is:

1. A method for automatically generating alarm aggregation rules using a computer system, the method comprising:
   receiving, by the computer system, information descriptive of a hierarchy of devices within a set of devices, each device within the set having one or more devices within the set that are associated with the device and each device of the set being capable of entering at least one anomalous state;
   identifying at least one type of alarm aggregation rule that applies to at least one device within the set based on the at least one anomalous state that the at least one device is capable of entering;
   defining an alarm aggregation rule having the at least one type, automatically, based on the information descriptive of the hierarchy of devices within the set of devices and a matching anomalous state between the at least one device and other devices within the set of devices; and
   storing an association between the alarm aggregation rule having the at least one type and the set of devices.

2. The method according to claim 1, wherein receiving the information descriptive of the hierarchy of devices includes receiving at least one of information descriptive of an electrical distribution hierarchy and information descriptive of a data distribution hierarchy.

3. The method according to claim 1, wherein identifying the at least one type of alarm aggregation rule includes identifying one or more types of alarm aggregation rules from a table of alarm aggregation rule types.

4. The method according to claim 3, wherein identifying the one or more types of alarm aggregation rules includes identifying the one or more types of alarm aggregation rules from a table that includes types of alarm aggregation rules that are applicable to an electrical distribution hierarchy.

5. The method according to claim 1, further comprising:
   receiving information descriptive of at least one alarm;
   determining that the at least one alarm is subject to the alarm aggregation rule; and
   identifying an origin device based on the information descriptive of the at least one alarm, the alarm aggregation rule, and the information descriptive of the hierarchy of devices within the set of devices.

6. The method according to claim 5, wherein identifying the origin device includes identifying at least one of a feeder device, a load device, and an intermediate device.

7. The method according to claim 5, wherein the information descriptive of the at least one alarm is descriptive of a plurality of alarms generated by a subset of devices from the set of devices, the method further comprising identifying the subset of devices based on the origin device and the alarm aggregation rule.

8. The method according to claim 7, further comprising displaying a representation of an instance of an aggregated alarm, the representation including a representation of the origin device and the subset of devices.

9. A system for generating alarm aggregation rules, the system comprising:
a memory; and
at least one processor coupled to the memory and configured to:
receive information descriptive of a hierarchy of devices within a set of devices, each device within the set having one or more devices within the set that are associated with the device and each device of the set being capable of entering at least one anomalous state;
identify at least one type of alarm aggregation rule that applies to at least one device within the set based on the at least one anomalous state that the at least one device is capable of entering;
define an alarm aggregation rule having the at least one type, automatically, based on the information descriptive of the hierarchy of devices within the set of devices and a matching anomalous state between the at least one device and other devices within the set of devices; and
store an association between the alarm aggregation rule having the at least one type and the set of devices.

10. The system according to claim 9, wherein the at least one processor is configured to receive the information descriptive of the hierarchy of devices by receiving at least one of information descriptive of an electrical distribution hierarchy and information descriptive of a data distribution hierarchy.

11. The system according to claim 9, wherein the at least one processor is configured to identify the at least one type of alarm aggregation rule by identifying one or more types of alarm aggregation rules from a table of alarm aggregation rule types.

12. The system according to claim 11, wherein the table includes types of alarm aggregation rules that are applicable to an electrical distribution hierarchy.

13. The system according to claim 9, wherein the at least one processor is further configured to:
receive information descriptive of at least one alarm;
determine that the at least one alarm is subject to the alarm aggregation rule; and
identify an origin device based on the information descriptive of the at least one alarm, the alarm aggregation rule, and the information descriptive of the hierarchy of devices within the set of devices.

14. The system according to claim 13, wherein the at least one processor is configured to identify the origin device by identifying at least one of a feeder device, a load device, and an intermediate device.

15. The system according to claim 13, wherein the information descriptive of the at least one alarm is descriptive of a plurality of alarms generated by a subset of devices from the set of devices and the at least one processor is further configured to identify the subset of devices based on the origin device and the alarm aggregation rule.

16. The system according to claim 15, wherein the at least one processor is further configured to display a representation of an instance of an aggregated alarm, the representation including a representation of the origin device and the subset of devices.

17. A non-transitory computer readable medium storing instructions for executing an alarm aggregation rule definition process, the instructions being executable by at least one processor of a computer system, the instructions instructing the computer system to:
receive information descriptive of a hierarchy of devices within a set of devices, each device within the set having one or more devices within the set that are associated with the device and each device of the set being capable of entering at least one anomalous state;
identify at least one type of alarm aggregation rule that applies to at least one device within the set based on the at least one anomalous state that the at least one device is capable of entering;
define an alarm aggregation rule having the at least one type, automatically, based on the information descriptive of the hierarchy of devices within the set of devices and a matching anomalous state between the at least one device and other devices within the set of devices; and
store an association between the alarm aggregation rule having the at least one type and the set of devices.

* * * * *